US 11,994,303 B2

(12) United States Patent
Allcorn et al.

(10) Patent No.: US 11,994,303 B2
(45) Date of Patent: May 28, 2024

(54) SMART THERMOSTAT AND A THERMOSTAT ADAPTER WITH INTEGRATED SAFETY INTERLOCK FOR INSTALLATION AND DIAGNOSTICS OF AN IN-FLOOR HEATING SYSTEM

(71) Applicant: Watts Regulator Co., North Andover, MA (US)

(72) Inventors: Dustin Wade Allcorn, Republic, MO (US); Thomas Jeffery Rudnick, Springfield, MO (US); Serge Seminutin, Vernon (CA); Michael William Fraser, Armstrong (CA); Geoffery Paul Bisson, Coldstream (CA); Brendan Koch, Coldstream (CA)

(73) Assignee: WATTS REGULATOR CO., North Andover, MA (US)

( * ) Notice: Subject to any disclaimer, the term of this patent is extended or adjusted under 35 U.S.C. 154(b) by 750 days.

(21) Appl. No.: 15/930,384

(22) Filed: May 12, 2020

(65) Prior Publication Data
US 2021/0356140 A1    Nov. 18, 2021

(51) Int. Cl.
G01M 1/38 (2006.01)
F24D 13/02 (2006.01)
F24D 19/10 (2006.01)

(52) U.S. Cl.
CPC ......... F24D 19/1096 (2013.01); F24D 13/02 (2013.01)

(58) Field of Classification Search
CPC .................................... F24D 19/1096
USPC .......................................... 700/278
See application file for complete search history.

(56) References Cited

U.S. PATENT DOCUMENTS

| 3,774,189 A | 11/1973 | Brown |
| 4,439,666 A | 3/1984 | Graham |
| 4,520,417 A | 5/1985 | Frank |
| 4,878,332 A | 11/1989 | Drake |
| 5,119,988 A * | 6/1992 | Fiedrich ............. F24D 19/1033 237/8 C |

(Continued)

FOREIGN PATENT DOCUMENTS

| WO | 8502514 A1 | 6/1985 | |
| WO | WO-8502514 A * | 6/1985 | ......... F24D 19/1096 |
| WO | 2011151516 | 12/2011 | |

OTHER PUBLICATIONS

SunStat Connect Installation and Operation Manual, Watts Water Technologies, 2015.

(Continued)

Primary Examiner — Evral E Bodden
(74) Attorney, Agent, or Firm — Grossman, Tucker, Perreault & Pfleger, PLLC

(57) ABSTRACT

An adapter device and/or a thermostat device for use during installation and testing of in-floor heating systems. The adapter device allows for temporary electrical interconnection between a mat and an AC power source, and includes at least one switch configured to actuate based on a user-supplied force (e.g., a finger press) to temporarily electrically couple the mat to an AC power source. The at least one switch is further configured to automatically de-actuate in the absence of the user-supplied force to electrically decouple the mat from the AC power source. The thermostat device includes at least one integrated power measurement circuit for testing and diagnostics of an in-floor heating system.

25 Claims, 13 Drawing Sheets

(56) References Cited

U.S. PATENT DOCUMENTS

| | | | | |
|---|---|---|---|---|
| 5,920,191 | A | 7/1999 | Maniero et al. | |
| 6,300,598 | B1 | 10/2001 | Chiles et al. | |
| 7,071,446 | B1 * | 7/2006 | Bench | E04D 13/103 |
| | | | | 219/535 |
| 7,941,530 | B2 * | 5/2011 | Ha | F24F 11/52 |
| | | | | 709/224 |
| 9,291,694 | B2 * | 3/2016 | Maguire | G01R 35/04 |
| 9,829,528 | B2 | 11/2017 | Schlueter | |
| 10,298,972 | B2 | 2/2019 | Novotny et al. | |
| 10,241,482 | B2 * | 3/2019 | Fadell | G05D 23/1917 |
| 11,016,129 | B1 * | 5/2021 | Epard | G01R 19/2513 |
| 2010/0100306 | A1 * | 4/2010 | Gamache | F02N 11/0803 |
| | | | | 701/113 |
| 2011/0163759 | A1 * | 7/2011 | Ishii | H02H 3/162 |
| | | | | 324/551 |
| 2013/0073244 | A1 * | 3/2013 | Simons | F24F 11/49 |
| | | | | 702/113 |
| 2014/0035596 | A1 * | 2/2014 | Lee | G06F 1/28 |
| | | | | 324/522 |
| 2019/0310831 | A1 * | 10/2019 | Gillette | F24F 11/30 |
| 2020/0309827 | A1 * | 10/2020 | Sharon | H02J 3/00 |

OTHER PUBLICATIONS

TapeMat Installation Manual, Seres D12, C12 & C15, Watts Water Technologies, 2015.
LoudMouth Operating Instructions, Watts Radiant, 2015.
Heated Floors in 4 Simple Steps, SunTouch 2018.
Extended European Search Report from related matter 21173566.7 dated May 8, 2021.
Office Action from related European Appln. No. 21173566.7, dated Apr. 14, 2023. 6 pages.

* cited by examiner

SMART THERMOSTAT AND A THERMOSTAT ADAPTER WITH INTEGRATED SAFETY INTERLOCK FOR INSTALLATION AND DIAGNOSTICS OF AN IN-FLOOR HEATING SYSTEM

TECHNICAL FIELD

This specification relates generally to in-floor heating systems such as radiant heat floor systems, and more particularly, a thermostat device with one or more integrated power measurement circuits to detect power-related conditions and/or line faults both during installation of an in-floor heating system and post-install, and further to a thermostat adapter with an integrated safety interlock to removably couple to a thermostat device and enable temporary/momentary electrical communication between an alternating current (AC) power source and an in-floor heating element during installation and testing.

BACKGROUND INFORMATION

In-floor heating systems, such as radiant floor heating systems, continue to grow in popularity both in new construction and remodeling of homes and commercial buildings. Installation of such in-floor heating systems generally necessitates a relatively high level of skill and training for installers, as well as multiple specialized tools and processes to ensure proper installation.

For example, installers of in-floor heating systems generally go through training in a wide range of related topics including, for example, thin-set and thick-set mortaring practices (and associated set times), electrical requirements and basic electrical safety, and manufacturer-specific guidelines and precautions. Unfortunately, many installers receive inadequate training. However, even the most trained and observant installers can make mistakes during installation, with those mistakes leading to premature component failures, increased service costs, and potentially dangerous conditions for both the installer and the end-user.

BRIEF DESCRIPTION OF THE DRAWINGS

Various aspects, features and advantages of the present disclosure will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

Figure 1:
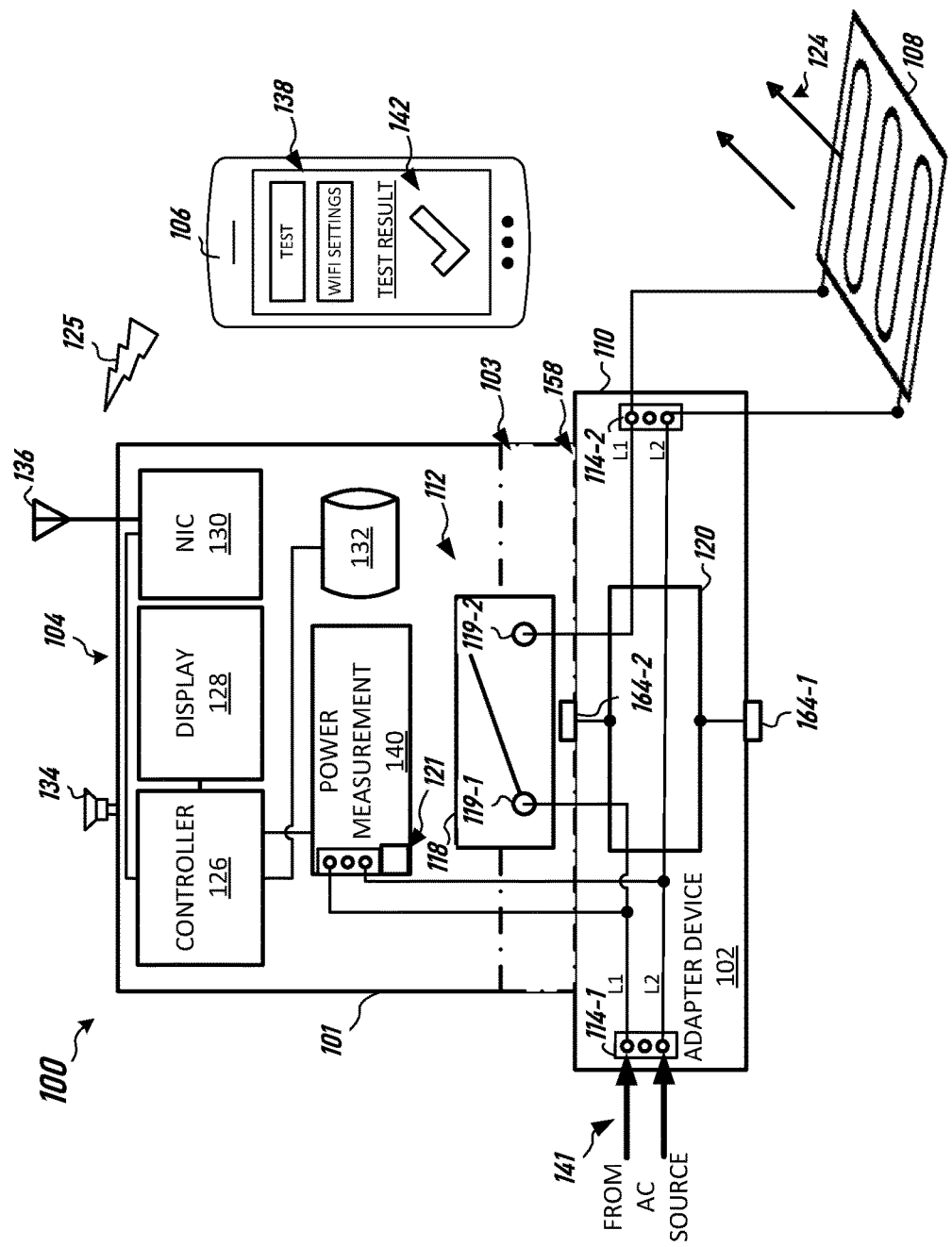
FIG. 1 shows an example system for use during installation, testing, and diagnostics of an in-floor heating system, in accordance with embodiments of the present disclosure.

As discussed above, installation of in-floor heating systems raise numerous non-trivial challenges, even for experienced installers who receive adequate training. Such challenges include accidentally damaging a heating element (also referred to herein as a heating mat, or simply a mat) during installation, and not discovering the damage until after the mortar has set. In addition, careful attention must be paid to max current and voltage ratings for heating mats and associated cabling. Over-current situations and/or operating a 120 voltage alternating current (Vac) heating mat with a 220Vac source can cause system failure, or worse yet, create unsafe conditions for the installer and/or the end-user.

In recognition of these challenges, installers often utilize a number of tools including multi-meters, clamping current meters, continuity testers, line-fault testers, wire strippers, and other standard tools such as hammers and trowels. Installers generally perform a number of safety checks and confirmations at various stages of installation such as measuring electrical resistances of the heating mat and associated cables, double checking current and voltage ratings of a mat in view of the provided AC source/circuit, performing current measurement and voltage measurements for verification, and so on. Continued improvements in the context of in-floor heating systems depend at least in part on simplifying installation procedures to reduce the potential for installation errors, undiscovered/latent damage to in-floor heating systems during installation, and creation of unsafe conditions.

Thus, in accordance with an embodiment, a thermostat adapter is disclosed for use during installation and testing of in-floor heating systems. The thermostat adapter may also be referred to herein as an adapter device or simply an adapter. The adapter device allows for temporary electrical interconnection between a mat and an AC power source, and includes one or more switches configured to actuate, e.g., based on a user-supplied force, and temporarily electrically couple a heating mat to an AC power source to energize the same. Preferably, the one or more switches are implemented as momentary switches to automatically de-actuate, e.g., transition from a closed to an open state/orientation, in response to the absence of the user-supplied force.

In addition, the adapter device is configured to removably couple to a thermostat device and provide electrical power to the same based on, for example, actuation of the one or more momentary switches. A user may then subsequently select one or more options via a display of the thermostat device to momentarily energize the mat via the AC power source, and/or perform one or more test and diagnostic processes as variously disclosed herein. Preferably, the adapter device is configured with a second switch that operates as an interrupt that prevents energizing pins/terminals of the adapter device and/or the mat with AC power in the event the thermostat device is decoupled from the adapter device. In any such cases, the adapter device allows for a user to immediately interrupt AC power to the thermostat device and/or the mat by simply removing pressure (or otherwise de-actuating) at least one of the momentary switches.

Various aspects and features disclosed herein are also directed to a thermostat device, also referred to herein as a control unit, having at least one power measurement circuit to measure an electrical characteristic of an AC power source and/or mat. In an embodiment, the thermostat device further includes hardware and/or software (e.g., firmware) to adjust operation of an in-floor heating system, e.g., a temperature set point, schedule to establish automatic floor heating on/off times and temperatures, and so on. The thermostat device may also be referred to as a so-called "smart" thermostat based on the ability of the thermostat to utilize the at least one power measurement circuit to, for example, verify voltage compatibility between a mat and an AC source, monitor for overcurrent conditions, and/or perform long-term measurement sampling to allow power measurement tracking and reporting (e.g., Kilowatt usage per hour, day, month).

Moreover, the smart thermostat can also provide cost estimates for a user, e.g., based on interpolation from previous/historical power measurements from the at least one power measurement circuit, heuristics, and/or a combination of both, to allow the user to set schedules and operate an in-floor heating system in an informed manner.

In one non-limiting preferred embodiment, a thermostat device consistent with the present disclosure can include features and functions of existing thermostat controllers, the aforementioned "smart" features discussed above, and/or installation functions and features such as momentary tests, electrical characteristic measurements for an AC source and heating mat, and line-fault tests to alert installers to faults prior to mortar curing.

Further, a thermostat device consistent with the present disclosure allows for simple registration with a remote server, e.g., via the Internet, and storing of various electrical and configuration parameters for operation of the in-floor heating system, and measurements taken during test modes and/or power sampling for cost estimates and reporting purposes. Such registration can occur via user input at the thermostat (e.g., via a touch screen display provided by the thermostat) and/or through an "App" executed on a mobile computing device such as a smart phone, tablet, or laptop. Preferably, the app of the mobile computing device can utilize a fiducial such as a quick response (QR) code disposed on the thermostat to determine a unique identifier (ID) for the thermostat along with other related parameters.

For example, the app of the remote computing device may utilize the unique ID to register with a remote computer server, e.g., hosted by a manufacturer, and/or to initiate communication with the thermostat, e.g., via wireless protocols such as Wi-Fi, Bluetooth, near-field communication, and so on. The various mat-related electrical parameters (also referred to herein as predefined electrical values) may be provided manually by a user, and/or preferably through the app of the mobile computing device that can scan a fiducial such as a QR code disposed on the heating mat (and/or printed documentation). The predefined electrical values may therefore comprise, for example, a maximum voltage rating for the heating element (e.g., 120Vac or 220/240Vac) and the maximum current rating for the heating element (e.g., 5 A, 10 A). The thermostat may then utilize the predefined electrical values during testing and diagnostics procedures to detect fault conditions as variously disclosed herein. It should be appreciated that a predefined voltage parameter (e.g., predefined voltage rating, predefined current rating, predefined maximum current rating, or the like) may be a single value or a range of values.

Accordingly, the present disclosure provides numerous advantages and features over existing approaches to in-floor heating system installation and testing. For example, various aspects and features disclosed herein include providing a modular arrangement of components that integrate and couple together to provide a single point of electrical interconnection, e.g., between terminals of a heating mat and conductors providing AC power, and a safety interlock that prevents energizing of a heating mat (and/or the thermostat) in the event of an electrical misconfiguration or fault condition.

Thus, an adapter and thermostat consistent with the present disclosure provides a portable and safe approach to providing temporary electrical interconnection between AC power sources and a heating mat, and the ability to perform robust diagnostics and tests through, for instance, the push of one or more buttons (e.g., the push of a single button). The results of tests and diagnostics may then be seamlessly provided to remote hosts/servers, e.g., via the Internet, for purposes of technical support, quality control, and proper installation verification.

The term substantially, as generally referred to herein, refers to a degree of precision within acceptable tolerance that accounts for and reflects minor real-world variation due to material composition, material defects, and/or limitations in manufacturing processes. Such variation may therefore be said to achieve largely, but not necessarily wholly, the target/nominal characteristic. To provide one non-limiting numerical example to quantify "substantially," such a modifier is intended to include minor variation that can cause a deviation of up to and including ±10% from a particular stated quality/characteristic unless otherwise provided by the present disclosure.

The term "coupled" as used herein refers to any connection, coupling, link or the like between elements/components. In contrast, directly coupled refers to two elements in contact with each other in a manner that does not include an intermediate element/component disposed therebetween.

The use of the terms "first," "second," and "third" when referring to elements herein are for purposes of clarity and distinguishing between elements, and not for purposes of limitation. For example, the first switch 164-1 of FIG. 1 discussed below may also be referred to as a second switch, and likewise, the second switch 164-2 of FIG. 1 may also be referred to as a first switch in some scenarios. Likewise, like numerals are utilized to reference like elements/components between figures.

Turning to the Figures, FIG. 1 illustrates an example system 100 for use during installation, testing, and diagnostics of in-floor heating elements/systems. As shown, the system 100 includes an adapter device 102, an optional base 103, a thermostat 104, an optional mobile computing device 106, and a heating element 108 (also referred to herein as an in-floor heating element, a heating element, or simply a mat).

Note, the adapter device 102 may also be referred to herein as a thermostat adapter, or simply an adapter. In accordance with an embodiment, the adapter device 102 is configured for coupling to a thermostat (e.g., thermostat 104) and providing temporary electrical interconnection between the thermostat, an in-floor heating element (e.g., heating element 108), and an AC power source during installation and testing of the in-floor heating element.

Figure 3A:
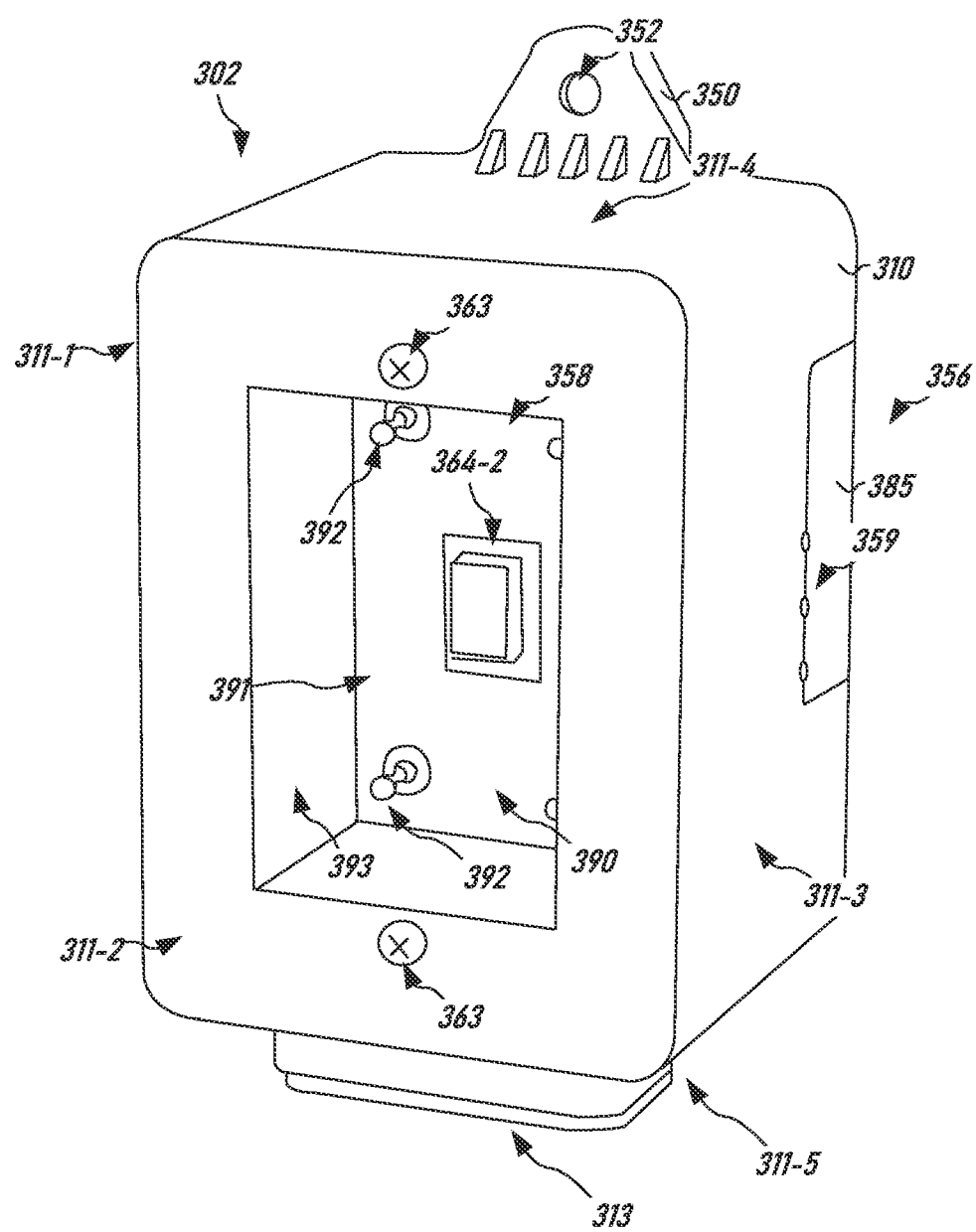
FIG. 3A shows a perspective view of an example adapter device suitable for use in the example systems of FIGS. 1 and 2, in accordance with an embodiment of the present disclosure.

The adapter device 102 includes a housing 110 having a plurality of sidewalls that define a cavity, e.g., cavity 390 of FIG. 3A. The adapter device 102 includes at least first and second terminal blocks 114-1, 114-2 coupled to the housing 110. Each of the first and second terminal blocks 114-1, 114-2 can be disposed on the same or different sidewalls of the housing 110. Preferably, the first and second terminal blocks 114-1, 114-2 are disposed on opposite and/or separate sidewalls of the housing 110. Note, the adapter device 102 can also utilize other types of electrical couplers/sockets as an alternative to, or in combination with, the first and second terminal blocks 114-1, 114-2, and this disclosure is not intended to be limiting in this regard. For example, and as discussed below, the first terminal block 114-1 can be alternatively implemented as C14 male plug, for example, and not necessarily a terminal block that is configured to receive and electrically couple to bare conductor wire.

Continuing on, the first terminal 114-1 can be implemented as, for instance, an N-pole terminal plug to removably couple to conductors provided by, for instance, 12 or 14 AWG wire. The first terminal block 114-1 may also be referred to as an AC power source interconnect. Preferably, the first terminal block 114-1 is implemented as a 3 pin Electrical AC Power Socket that can couple to an IEC-320-C13 or IEC-320-C14 plug. In any such cases, the first terminal block 114-1 can couple to conductors (e.g., L1, L2) to receive a power signal 141 in the form of an alternating current (AC) from AC mains, for instance.

The second terminal block 114-2 can also be implemented as, for instance, an N-pole terminal plug to removably couple to associated terminals of heating element 108 via 14 or 18 AWG wire, for example. The second terminal block 114-2 may also be referred to as a heating element interconnect. Preferably, the second terminal block 114-2 includes a plurality of conductor slots/openings, with each conductor opening configured to receive a bare end of a conductor wire and a clamping arrangement, e.g., a screw-actuated clamp, configured to securely couple the received conductor wire into an associated conductor opening. In an embodiment, such as shown below and discussed with reference to FIGS. 3A-3C, the second terminal block 114-2 preferably includes a cover 385 to provide wire strain relief and to reduce the potential of user contact with energized conductor wires.

However, other electrical interconnection approaches are within the scope disclosure including alligator clips, wire nuts, or any other suitable approach that allows for temporary electrical interconnection between heating element 108 and the second terminal block 114-2. Note, heating element 108 can comprise N number of heating elements electrically coupled to each other, e.g., in parallel, and the embodiment of FIG. 1 is not intended to be limiting. Further, the N number of heating elements may be disposed within flooring of this and covered by, for instance, tile. Thus, the heating element 108 may also accurately be referred to herein as an in-floor heating element.

The adapter device 102 further includes a safety interlock 120. The safety interlock 120 is configured to interrupt/disconnect electrical communication between an AC power source providing the power signal 141 and the heating element 108. In an embodiment, the safety interlock 120 comprises at least one momentary switch that includes a normally-open configuration. For example, as shown in FIG. 1, the safety interlock 120 comprises first and second switches 164-1, 164-2. As discussed in further detail below with reference to FIGS. 3A-3C, the first switch 164-1 can be disposed on the housing 110 of the adapter device 102 (e.g., see switch 364-1 in FIG. 3C) to allow a user to selectively actuate the same, e.g., via a finger press. The first switch 164-1 can therefore be configured to transition from an open state to a closed state based on user input. Preferably, the first switch 164-1 comprises a momentary switch having a spring member (not shown) to automatically transition the first switch 164-1 from a closed state to an open state in response to the absence of a user-supplied force.

The second switch 164-2 can be disposed in a location on the housing 110 at which the thermostat 104 removably couples to the adapter device 102 (e.g., see switch 364-2 in FIG. 3A). The second momentary switch can also be configured to transition from the open state to the closed state based on, for instance, the thermostat 104 being coupled to the adapter device 102.

Various examples and scenarios disclosed herein refer to the safety interlock 120 being configured to block/lock based on the state of the first and/or second switches 164-1, 164-2. However, the safety interlock 120 may also utilize additional switches such as one or more pins of the plurality of pins 392 (See FIG. 3A) configured as interrupt switches (also referred to herein as micro interrupt switches). Thus, the safety interlock 120 can utilize N number of switches and be configured to, in a general sense, logically AND the state of each switch of the adapter device 102 to prevent unsafe conditions, i.e., supply electrical power to the thermostat 104 and/or heating element 108 in the event one or more of the switches are in an open state.

In the specific non-limiting example of FIG. 1, the safety interlock 120 is configured to prevent (or interrupt) electrical communication between the heating element 108 and the AC power source providing the power signal 141 in the event that the first and/or second switches 164-1, 164-2, transitions to an open state. Alternatively, or in addition, the blocked state may also include the safety interlock 120 being configured to prevent or otherwise interrupt electrical communication between the thermostat 104 and the AC power source providing the power signal 141.

As further shown, the adapter device 102 can couple to thermostat, e.g., thermostat 104, via an optional thermostat base 103 (also referred to herein as a base) and/or directly couple to a thermostat without an intermediate base. The thermostat base 103 may be configured to allow for wall/surface mounting (post installation), and in some cases, to provide backplane circuitry to allow a thermostat coupled thereto to electrically connect with, for instance, AC mains, one or more floor sensors, and the heating elements 108. However, such backplane circuitry can be integrated into thermostats (e.g., into a single housing of a thermostat), and this disclosure is not limited in this regard.

As discussed in greater detail below with regard to FIGS. 3A-3C, the adapter device 102 can include a thermostat coupling section that allows for the thermostat 104 and/or thermostat base 103 to removably couple to, and electrically communicate with, an AC power providing the power signal 141 and/or the heating element 108.

Preferably, the adapter device 102 includes a thermostat coupling section 158 that enables coupling to a wide-range of thermostat types and/or associated bases to provide, in a general sense, a universal thermostat adapter. To this end, the thermostat coupling section 158, which may also be referred to herein as a thermostat coupling region, can include one or more temporary electrical interconnects to electrically couple to the thermostat 104. For example, and as shown FIG. 3A, the thermostat coupling section 358 includes a plurality of pins 392 that allow for coupling to virtually any thermostat and/or thermostat base that has electrically conductive contacts/pads disposed at positions that align with the pins 392.

Continuing on, and as shown in FIG. 1, a switching arrangement 112 is at least partially implemented within the thermostat base 103 and/or thermostat 104. Alternatively, or in addition, the switching arrangement 112 may be implemented within the adapter device 102, and/or, collectively implemented by circuitry/components of the thermostat 104, thermostat base 103, and/or adapter device 102. The switching arrangement 112 may also be referred to herein as a heating element control circuit. Preferably, the switching arrangement 112 is implemented at least partially within a housing 101 of the thermostat 104 to provide a range of testing functions and features disclosed herein without necessarily utilizing the thermostat base 103 or the adapter device 102.

In any such cases, the switching arrangement 112 includes at least one switch, e.g., switch 118. The switch 118 switchably electrically couples a first conductor (L1) of the first and second terminals 114-1, 114-2 together. In an embodiment, the switch 118 includes one or more mechanical relays, or one or more high-current metal-oxide-semiconductor field-effect transistor (MOSFETs), commonly referred to as power MOSFETs, or a combination of such mechanical and solid-state components depending on a desired configuration.

In the embodiment of FIG. 1, the switch 118 includes first and second switch terminals 119-1, 119-2 to complete a circuit that electrically couples the heating element 108 to an AC power source providing the power signal 141 in order to energize the heating element 108 and cause the same to radiate/emit heat 124. To this end, the switch 118 can be configured to transition between an open and closed state/orientation to switchably electrically decouple and couple, respectively, the heating element 108 to the power signal 141 of the AC power source.

Notably, the switch 118 is prevented/blocked from completing a circuit between the heating element 108 and AC power source providing the power signal 141 when the safety interlock 120 is in a locked/block state, e.g., based on the first and/or second switch 164-1, 164-2, being in an open state as discussed above. On the other hand, the switch 118 is able to complete the circuit between the heating element 108 and the AC power source providing the power signal 141 when the safety interlock 120 is in an unlocked/safe state, e.g., based on the first and/or second switch 164-1, 164-2, being in a closed state.

As shown, the thermostat 104 can include a plurality of components to support installation, diagnostics, and testing of in-floor heating elements. The thermostat 104 may include the housing 101, the controller 126, an optional display 128, an optional network interface circuit (NIC) 130, optionally memory 132, an optional speaker 134, an optional antenna device 136, and optional power measurement circuitry 140.

The controller 126 comprises at least one processing device/circuit such as, for example, a microcontroller (MCU), a digital signal processor (DSP), a field-programmable gate array (FPGA), Reduced Instruction Set Computer (RISC) processor, x86 instruction set processor, microcontroller, an application-specific integrated circuit (ASIC).

The controller 126 may comprise a single chip, or multiple separate chips/circuitry. The controller 126 can implement various methods and features disclosed herein, e.g., process 700 of FIGS. 7A-7C, using software (e.g., C or C++ executing on the controller 126), hardware (e.g., circuitry including hardcoded gate level logic or purpose-built silicon) or firmware (e.g., embedded routines executed by the controller 126), or any combination thereof. The controller 126 can communicatively couple with components of the thermostat 104 such as the NIC 130, the display 128, the memory 132, via a data bus, for example, to execute various processes and features disclosed herein.

The display 128 can comprise any suitable device such as a liquid crystal display (LCD) to allow for visualization of operational status, configuration menus, and other visual elements that allow for rendering of information to a user/installer. Preferably, the display 128 implements touch-screen functionality to allow for a user to navigate between menus, initiate one or more test modes as disclosed herein, and adjust settings such as a current temperature for the heating element 108 via touch gestures and actions such as swipes, flicks, and taps. The display 128 may therefore also be referred to as a touch-sensitive display.

The NIC 130 can comprise one or more circuits/chips that allow for the sending and receiving of radio frequency (RF) signals, and preferably for sending and receiving RF signals 125 that comport with WiFi standards such as 802.11b. However, the NIC 130 can be configured to implement one or more of a wide-range of wireless standards including, for instance, Bluetooth, Bluetooth Low Energy (BLE), Near-Field Communication (NFC), ZigBee, and so on. Preferably, the NIC 130 supports one or more wireless protocols for communicating with remote sensors such as remote temperature sensors.

Thus, the thermostat 104, and more specifically processes executed via controller 126 can send and receive data with a remote host, such as mobile computing device 106 and/or a computer server operated by a manufacturer of the thermostat 104 using a wide area network (WAN) as such as the Internet. The thermostat 104 can be configured to communicate directly with the mobile computing device 106, e.g., via Bluetooth, NFC, or indirectly via a wireless access point, e.g., via WiFi.

Moreover, the thermostat 104 may also be configured to utilize the mobile computing device 106 as an access point/proxy to allow the thermostat 104 to communicate with remote hosts through, for instance, a cellular data connection provided by the mobile computing device 106. Thus, the thermostat 104 may directly couple with the mobile computing device 106 by way of NIC 130 forming a Bluetooth/BLE connection with the same, and then communicate with one or more remote hosts via a cellular Internet gateway provided by the mobile computing device 106.

The memory 132 can comprise one or more volatile and/or non-volatile memory chips. The memory 132 can include machine-readable instructions, e.g., compiled or interpretable code, to allow for controller 126 to execute various processes such as thermostat control routines, user interface routines, and testing and diagnostic modes and processes as variously disclosed herein (e.g., see process 700 of FIGS. 7A-7C). In an embodiment, various mat-related electrical parameters (also referred to herein as predefined electrical values) may be stored in the memory 132. The predefined electrical values can comprise, for example, a maximum voltage rating for the heating element 108 (e.g., 120Vac or 220/240Vac) and the maximum current rating for the heating element 108 (e.g., 15A, 20A). In addition, the memory 132 can include a representation of a schedule that automatically energizes/de-energizes heating element 108 on specific days and times.

The optional speaker 134 can comprise any speaker device capable of being driven by controller 126 to output generated or predefined sounds. The optional speaker 134 may also be implemented as a piezoelectric buzzer. The optional speaker 134 may be disposed within the housing 101 of the thermostat 104, or other suitable location such as within the housing 110 of the adapter device 102. Predefined sounds may be stored as digitized samples in the memory 132, and the controller 126 may therefore retrieve the digitized samples and cause the optional speaker 134 to output/emit the same in an analog fashion as sound energy. Alternatively, or in addition, the controller 126 may generate various synthetic tones/sounds (e.g., by generating digital samples at one or more target frequencies) for output by the optional speaker 134.

In an embodiment, the thermostat 104 communicates with the mobile computing device 106 via RF signals 125, as discussed above. In this embodiment, an "app" executed on the mobile computing device 106 visualizes a user interface 138. The user interface 138 can include a plurality of user-selectable elements, e.g., e.g., buttons, that allow installation and diagnostic functions of the system 100 to be performed/initiated via the mobile computing device 106. For example, the user interface 138 of the mobile computing device 106 can assist in initial configuration of the thermostat 104 by allowing for the same to be identified via protocols implemented by the NIC 130, e.g., Bluetooth/BLE. Alternatively, or in addition, the mobile computing device 106 can include an image sensor to detect a fiducial disposed on the thermostat 104 for identification purposes and/or to initiate secure wireless communication between the mobile computing device 106 and the thermostat 104. Once identified, the user interface 138 can initiate a provisioning sequence based on user input to provide, for example, Wi-Fi access point details and authentication parameters (also referred to herein as WiFi Settings) to the thermostat 104 for storage in memory 132.

In addition, the user interface 138 of the "app" executed on the mobile computing device 106 may be configured to "mirror" or otherwise provide redundant access to features and functions of the thermostat 104 such that accessing the display 128 to view operational status, adjust settings, and perform various installation and diagnostic-related functions becomes optional. Accordingly, the thermostat 104 can operate headless (e.g., without a display 128, or via a limited number of visual indicators such as LEDs), however, the thermostat 104 preferably includes the display 128 to provide flexibility and simplify use of the thermostat 104 by an installer/user.

It should be noted that various features and aspects of user interface 138 and the "app" visualizing the same via the mobile computing device 106 as disclosed herein may also be implemented by the thermostat 104, e.g., in combination with controller 126, display 128, and memory 132. For example, the look, feel, and functionality of the "app" and user interface 138 of the mobile computing device 106 may be substantially similar to a user interface shown via display 128 of the thermostat 104. Accordingly, the features and functions of the "app" and user interface 138 discussed above are equally applicable to a user interface and user experience implemented by the thermostat 104 and will not be repeated for brevity.

As further shown in FIG. 1, the thermostat 104 includes power measurement and monitoring circuitry 140 electrically coupled to conductors L1/L2. The power measurement and monitoring circuitry 140 may also be referred to herein as power measurement circuitry. Preferably, the power measurement and control circuitry 140 is at least partially disposed in the housing 101 of the thermostat 104. In scenarios where the thermostat 104 is implemented as a thermostat, this advantageously allows the thermostat 104 to perform various diagnostic and test procedures as disclosed herein without necessarily requiring the adapter device 102. However, the power measurement circuitry 140 may be implemented at least in part within the housing 110 of the adapter device 102, and/or within the optional base 103.

In any such cases, and as discussed in greater detail below with reference to the example circuits of FIGS. 4A-6, the power measurement circuitry 140 can include one or more power measurement circuits configured to measure an electrical characteristic of the power signal 141 of the AC source and/or of the heating element 108. In an embodiment, the power measurement circuitry 140 includes at least one power measurement circuit implemented as the ammeter circuit 400 of FIG. 4A to, for instance, detect an overcurrent condition of the heating element 108, and/or the voltage monitoring circuit 500 of FIG. 5 to detect, for example, a voltage mismatch between the power signal 141 and the heating element 108 (e.g., 220/240Vac power source coupled to a 120Vac rated mat).

Preferably, the power measurement circuitry 140 includes at least two power measurement circuits which are each configured to measure a different power characteristic of the power signal 141 and/or the heating element 108. To this end, and returning to the prior example, an embodiment of the power measurement circuitry 140 can include a first power measurement circuit configured as the ammeter circuit 400 of FIG. 4A, and a second power measurement circuit configured as the voltage monitoring circuit 500 of FIG. 5. In addition, this embodiment can also include the power measurement circuitry 140 having a third power measurement circuit configured as the line-fault monitoring circuit 600 of FIG. 6. Each of the first, second, and/or third power measurement circuits can be implemented within the housing 101 of the thermostat 104 to advantageously provide a thermostat having a range of test and power monitoring features.

The power measurement circuitry 140 generally includes a high-power side, e.g., to couple to an AC power source and receive a 120Vac or 220Vac power signal 141, and a low-power side with a power rail that provides 5 volts, or preferably 3.3V direct current (DC), to relatively low-power components/chips such as hall effect sensors. Electrical isolation may be provided through the use of a transformer or other suitable device capable of providing galvanic isolation between the aforementioned high and low-power sides. Such components can require a significant amount of space within the housing 101 of the thermostat 104. Accordingly, the power measurement circuitry 140 may also be implemented at least in part within a separate housing that electrically couples to the thermostat 104, and preferably in a separate housing/device that can communicate wirelessly with the thermostat 104 via NIC 130, for example. In an embodiment, the power measurement circuitry 140 can also include an overload interrupt circuit (OIC) 121 that can detect overcurrent conditions, e.g., a current drawn by the heating element 108 in excess of a threshold target such as 15 Amperes (A), and can output a signal or otherwise communicate with controller 126 to indicate an overcurrent fault or normal state.

Figure 2:
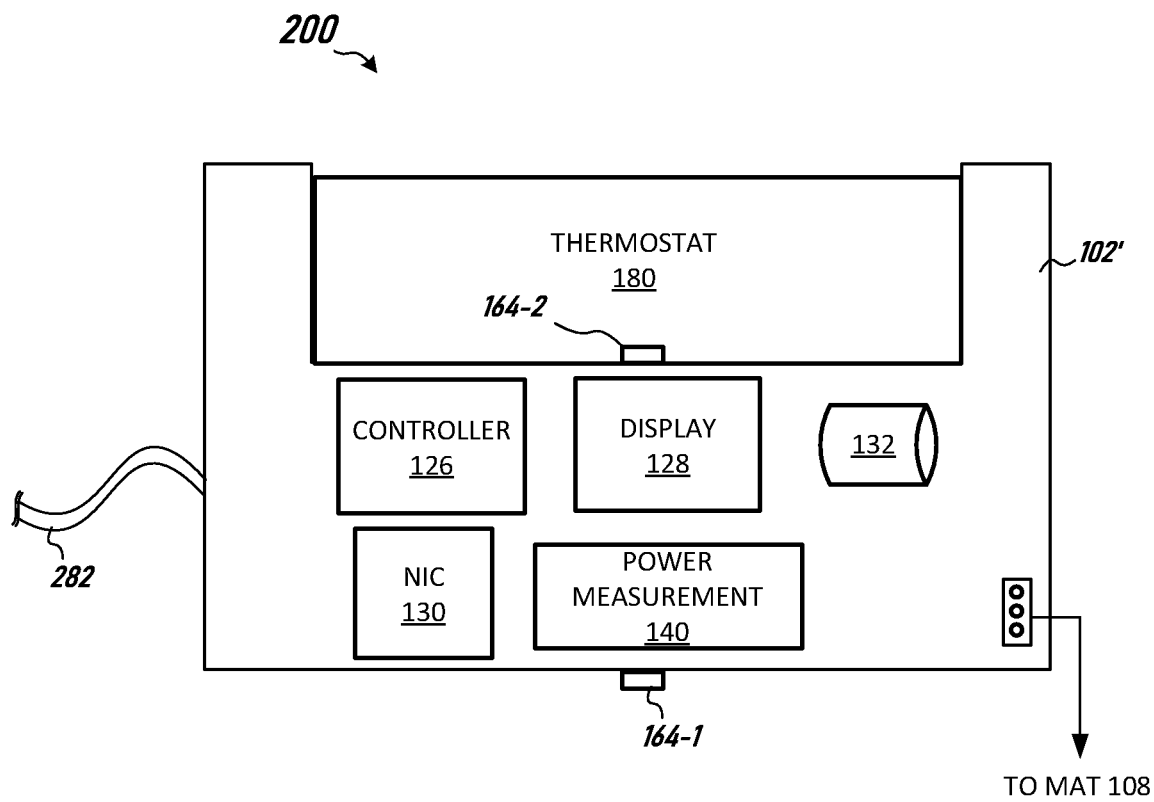
FIG. 2 shows another example system for use during installation, testing, and diagnostics of an in-floor heating system, in accordance with an embodiment of the present disclosure.

FIG. 2 shows another example system 200 consistent with aspects of the present disclosure. The system 200 may be configured substantially similar to that of the system 100 of FIG. 1, and like reference numerals refer to like elements. However, as shown in FIG. 2, the system 200 includes an adapter device 102' that can operate with a standard thermostat 180, and provide temporary electrical interconnection between an AC source 282 and the heating element 108 via, for instance, first and/or second switches 164-1, 164-2. The thermostat 180 may not necessarily include, for instance, components such as the power measurement circuitry 140, NIC 130, and so on as shown above in FIG. 1. Instead, the adapter 102' can implement various components of the thermostat 104 (FIG. 1) such as the controller 126, the display 128, the NIC 130, the memory 132, and the power measurement circuitry 140. Thus, the system 200 can provide an adapter device 102' that supports a range of existing thermostats that do not necessarily include the "smart" functions and capabilities disclosed herein.

Figure 3B:
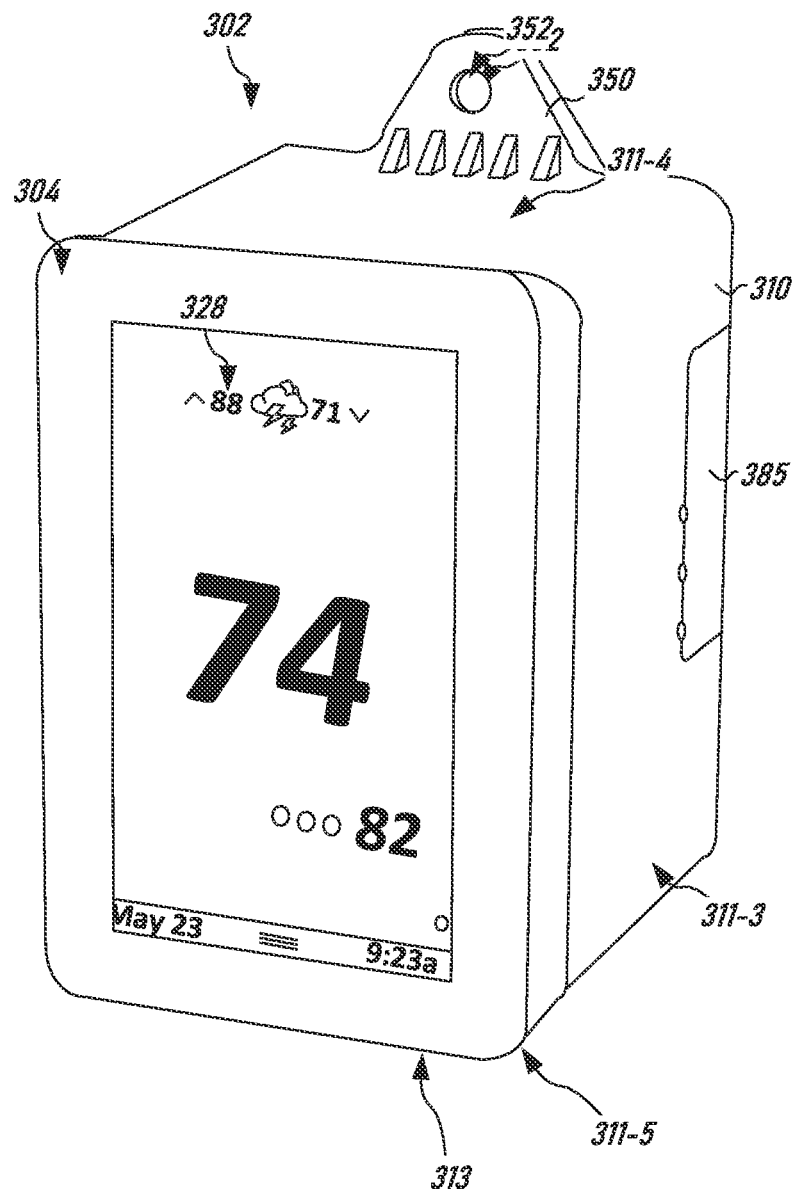
FIG. 3B shows a perspective view of the example adapter device of FIG. 3A removably coupled to a thermostat, in accordance with an embodiment of the present disclosure.
Figure 3C:
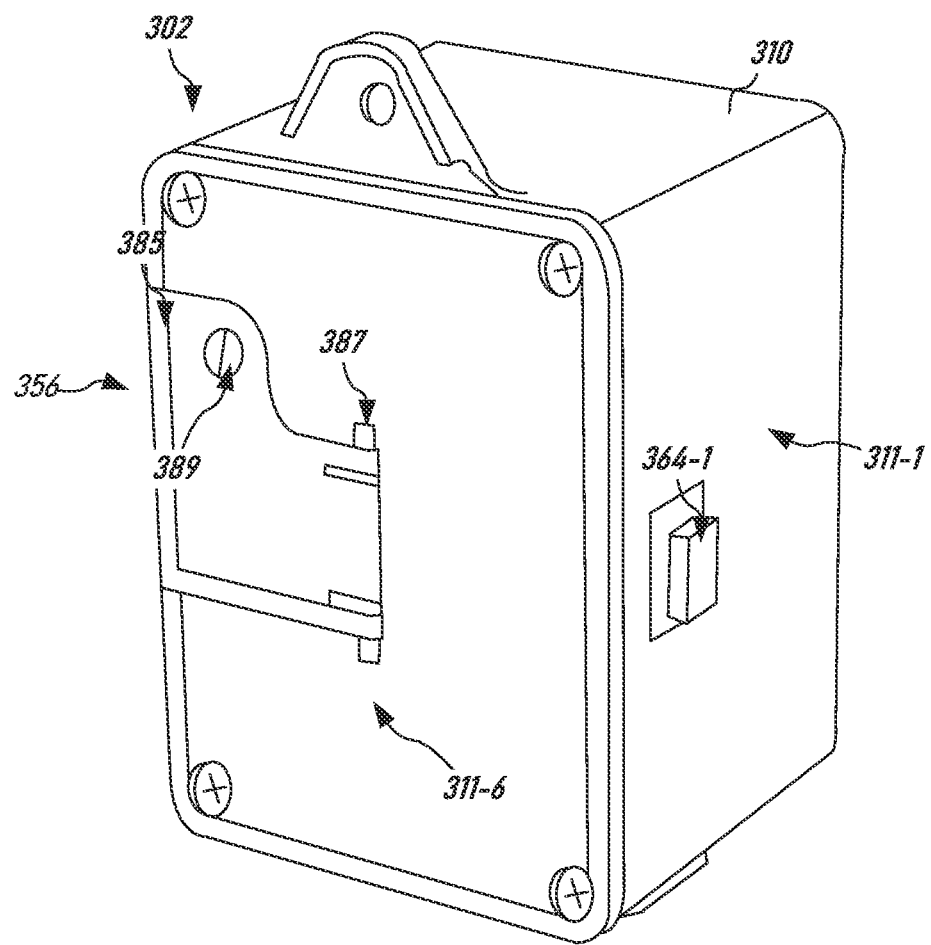
FIG. 3C shows another perspective view of the example adapter device of FIG. 3A, in accordance with an embodiment of the present disclosure.

Turning to FIGS. 3A-3C, an example adapter device 302 suitable for use within the example system 100 is shown. As shown, the adapter device 302 includes a housing 310 defined by a plurality of sidewalls, e.g., sidewalls 311-1 to 311-6. The housing 310 comprises plastic, metal, or any other suitably ridged material. Preferably, the housing 310 is formed of an electrically insulative material having a relatively high dielectric (Dk) constant of at least 2.0, e.g., Acrylonitrile Butadiene Styrene (ABS) which has a Dk between 2.4 and 5.0.

As further shown, the first sidewall 311-1 (See FIG. 3C) of the housing 310 provides a first switch 364-1 disposed thereon. The second sidewall 311-2 (See FIG. 3A) of the housing 310 defines a thermostat coupling section 358. The third sidewall 311-3 (See FIGS. 3A, 3B) of the housing 310 provides at least a first portion of the heating element coupling section 356. The fourth sidewall 311-4 of the housing 310 provides a temporary mounting member 350. The fifth sidewall 311-5 provides an AC coupling section 313 with a port/socket (not shown) to couple to, for instance, a male or female plug comporting with IEC-320-C13 or IEC-320-C14, for example. The sixth sidewall 311-6 (See FIG. 3C) provides at least a second portion of the heating element coupling section 356.

Each component of the adapter device 302 will now be discussed in turn, and with reference to a particular sidewall providing the component for clarity and ease of description. However, the particular configuration shown in FIGS. 3A-3C is not intended to be limiting. For example, the housing 310 can include other shapes and profiles and not necessarily a rectangular profile as shown. Likewise, various components such as the first switch 364-1 and temporary mounting member 350 may be disposed at other locations on the housing 310 with minor modification, and each component is not intended to be limited to only the sidewalls/locations shown.

Continuing on, the housing 310 further includes the temporary mounting member 350 disposed adjacent an interface/transition between the fourth sidewall 311-4 and the sixth sidewall 311-6. The temporary mounting member 350 is configured to allow the housing 310 of the adapter device 302 to be temporarily attached/mounted to a wall or other vertical surface during installation of an in-floor heating system.

As shown, the temporary mounting member 350 includes a through hole 352. During installation of an in-floor heating system, a nail, screw, peg, or other temporary attachment device may be inserted into a wall and used to hang the housing 310 in a desired location via through hole 352. Alternatively, the housing 310 may be disposed on a surface such as a counter top, floor, or shelf.

The housing 310 of the adapter device 302 further includes the heating element coupling section 356 disposed at least in part on the third sidewall 311-3 of the housing 310. The heating element coupling section 356 is configured to allow for temporary electrical interconnection between the second terminal block 114-2 and the heating element 108, for example.

As shown more clearly in FIG. 3C, the heating element coupling section 356 is also provided at in part by a door/cover 385 disposed adjacent the sixth sidewall 311-6 of the housing 310. Preferably, the door/cover 385 provides at least a portion of the sixth sidewall 311-6. The door 385 includes a one or more (e.g., a plurality of) apertures/through holes 359 (See FIG. 3A) configured to allow, for example, 14 or 18 AWG wire to extend therethrough and electrically couple with the second terminal block 114-2. Preferably, each of the apertures 359 are configured to allow at least one conductor wire and/or associated sheath to extend therethrough.

As further shown in FIG. 3C, the door 385 can include a hinge 387 to rotatably couple to the housing 310. The door 385 can further include tensioning member 389, e.g., a screw. The tensioning member 389 can be configured to selectively set/apply a bias force supplied against the door 385 and towards the housing 310. The door 385 may therefore be selectively tensioned via tensioning member 389 to provide strain relief for wires/cabling of the mat 108 coupled to the heating element coupling section 356. The door 385 may therefore provide both strain relief for the wires/cabling to the heating element 108, and comport with various safety requirements/standards that stipulate covering/shielding conductor wires to avoid incidental contact between conductor wires and users/installers.

Returning to FIG. 3A, the thermostat coupling section 358 is provided adjacent the second sidewall 311-2. The thermostat coupling section 358 may also be referred to herein as a thermostat mounting section/region, a control unit mounting region, or simply a mounting region. The thermostat coupling section 358 can include a cavity/recess 390. The cavity 390 is defined at least in part by a recessed surface 391 that is offset from the second sidewall 311-2, and that extends substantially parallel with the second sidewall 311-2. The cavity 390 is further defined by an interior sidewall 393 that extends between and adjoins the recessed surface 391 and the second sidewall 311-2.

The cavity 390 can be configured to at least partially receive a portion of the thermostat 304 (e.g., implemented as the thermostat 104 of FIG. 1) and/or a thermostat base coupled thereto (not shown). As further shown in FIG. 3A, the second sidewall 311-2 can provide one or more threaded inserts/recesses disposed adjacent the cavity 390. The threaded recesses can be utilized to securely couple the base 103 (FIG. 1) to the housing 310, e.g., using screws 363. Once securely attached, a thermostat such as the thermostat 304 (See FIG. 3B) may then be coupled to the housing 310 by way of the thermostat base 103, although this disclosure is not limited in this regard and the thermostat 304 may be configured to directly couple to the housing 310 of the adapter device 302, e.g., without an intermediate component such as the thermostat base 103.

As shown, the cavity 390 further includes a second switch 364-2 and a plurality of pins 392 disposed on/adjacent the recessed surface 391. The second switch 364-2 is preferably disposed in substantially the center of the thermostat coupling section 358, and more particularly, substantially the center of the recessed surface 391 of the cavity 390, although the second switch 364-2 can be disposed at other locations/surfaces within the cavity 390 with minor modification. Likewise, the second switch 364-2 may comprise two or more switches within the cavity 390 to minimize or otherwise reduce the potential for accidently energizing pins 392 with AC power without the thermostat 304 attached/coupled.

The plurality of pins 392, which may also be referred to as electrical interconnects, allow for electrically coupling the adapter device 302 with the thermostat 304, and to supply the power signal 141 (See FIG. 1) to the thermostat 304. In an embodiment, the plurality of pins 392 may each comprise, for example, spring-based pogo pins. Each pin of the plurality of pins 392 can include a first section (or portion) that extends substantially transverse from the recessed surface 391 into the cavity 390 to make electrical connection with mating pins of the thermostat 304. A second section of each pin of the plurality of pins 392 can extend into the housing 310 to electrically couple to, for instance, associated circuitry within the housing 310 such as the safety interlock 120 (See FIG. 1). Alternatively, or in addition, other types of temporary electrical interconnects may be utilized and this disclosure is not limited to utilizing pins/pogopins to temporarily electrically couple the adapter device 302 with the thermostat 304.

Note, one or more pins of the plurality of pins 392 may also be utilized as momentary switches (also referred to as micro switch interrupts) with a normally-open state that prevents/interrupts electrical communication between the thermostat 304 and/or heating element 108 in response to the thermostat 304 being decoupled from the housing 310 of the adapter device 302. Therefore, one or more pins of the plurality of pins 392 operating as momentary switches may be utilized to replace the second switch 364-2, or be utilized in combination with the second switch 364-2. In any such cases, the safety interlock 120 as discussed above may utilize one or more of the pins 392 as the aforementioned micro switch interrupts to block and/or disrupt AC power to the thermostat 304 and/or heating element 108 to further increase safety.

As shown in FIG. 3B, the thermostat 304 removably couples to the adapter device 302 at least in part based on at least a portion of the thermostat 304 being received in the cavity 390 (See FIG. 3A). In response to the thermostat 304 coupling via cavity 390, the thermostat 304 actuates the second switch 364-2 to transition the same from an open state to a closed state, e.g., based on the portion of the thermostat 304 received within the cavity 390 displacing the second switch 364-2. Note, in instances where the thermostat 304 couples to the adapter device 302 via a thermostat base, e.g., thermostat base 103, a portion of the thermostat base received within the cavity 390 may therefore cause displacement of the second switch 364-2.

In any such cases, the second switch 364-2 may therefore be configured to transition from the open state to the closed state in response to a user-supplied force introduced by a user coupling the thermostat 304 into the cavity 390 of the housing 310, and thus by extension, displacing/biasing the second switch 364-2 towards the rear of the housing 310, e.g., the sixth sidewall 311-6.

The thermostat 304 electrically couples to the adapter device 302 via mating pads/terminals (not shown) disposed on the thermostat 304 that align and engage (directly) with the pins 392 in response to the thermostat 304 coupling to the adapter device 302, e.g., via cavity 390. The thermostat 304 may then be referred to as in a connected state when removably coupled to the adapter device 302 via the thermostat mounting region 358, such as shown in FIG. 3B. On the other hand, the thermostat 304 may be referred to as in a disconnected state when decoupled from the thermostat mounting region 358 of the adapter device 302. The pins 392 may engage the thermostat 304 (e.g., via the mating pads/terminals) before the second switch 364-2 transitions from the open state to the closed state.

Turning specifically to FIG. 3C, the housing 310 of the adapter device 302 includes the first switch 364-1 disposed on the first sidewall 311-1. Preferably, the first switch 364-1 is disposed on the first sidewall 311-1 as shown in FIG. 3C, with the first sidewall 311-1 extending substantially transverse relative to the second sidewall 311-2 that provides the thermostat coupling section 358 (See FIG. 3A). However, the first switch 364-1 may be disposed on other locations/sidewalls of the housing 310 with minor modification.

In an embodiment, the first switch 364-1 can comprise a switch, button, or any other suitable device capable of receiving user input and converting the same into mechanical actuation, an electrical signal, or a combination thereof. For example, the first switch 364-1 can be implemented as a touch-sensitive switch that can detect the presence of a finger or a pointer of a user, e.g., a stylus. In an embodiment, the first switch 364-1 comprises a momentary switch that is spring-loaded via a spring member (not shown) or otherwise configured to automatically transition from a closed state to an open state in the absence of a user-supplied force. Preferably, the first switch 364-1 is configured to mechanically interrupt electrical communication between the heating element 108 and the AC power source providing the power signal 141, or the thermostat 104 and the AC power source providing the power signal 141, or both.

The first switch 364-1 may therefore be configured to provide the power signal 141 received from an AC power source to the heating element 108 (FIG. 1) and/or thermostat 304 for a predetermined period of time that is preferably user selected and equal to a period of time starting from when a user-supplied force is first present/applied to the first switch 364-1 to the moment the user-supplied force is no longer supplied, e.g., based on a user lifting their finger from the first switch 364-1.

Note, as discussed further below, the predetermined amount of time before disrupting power may also be set by the controller 126 (or other suitable controller such as provided by the remote computing device 106) when performing tests such as overcurrent detection. Accordingly, and in an embodiment, the user may continue to actuate the first switch 364-1 with their finger, but the controller 126 may decouple the power signal 141 of the AC power source from the heating element 108 via switch 118, for instance, after a predetermined amount of time that allows for energizing of the heating element 108 and electrical measurements of the same to be performed, e.g., 500 ms to 10 seconds.

Returning to FIG. 3B, the thermostat 304 receives the power signal 141 via a port/socket provided by AC coupling section 313, for example, and utilizes the same to supply power to components of the thermostat 304 such as the display 328. In this energized scenario, the thermostat 304 may therefore be referred to as in a powered state. In some cases, and as discussed below with regard to the process 700 of FIGS. 7A-7C, the thermostat 304 receives power in response to the actuation of the first and/or second switches 364-1, 364-2. For instance, the second switch 364-2 can be actuated in response to the thermostat 304 being coupled into the cavity 390, as discussed above. In addition, the first switch 364-1 can be actuated based on, for instance, a user-supplied force being applied thereto.

In any such cases, the thermostat 304 can visualize an operational state of the adapter device 302 and associated components via a user interface rendered on display 328 when in the aforementioned connected and powered state (e.g., when coupled to the adapter device 302 and energized). For example, the operational state can include a value representing a current temperature of the in-floor heating element (See FIG. 3B), e.g., based on a temperature sensor (not shown) disposed adjacent heating element 108 and electrically coupled to backplane circuitry within the adapter device 302. Note, the temperature sensor may be wirelessly coupled to the thermostat 304 via NIC 130, for example, to reduce the necessity of routing wires within the floor.

Other examples of an operational state can include one or more measured electrical characteristics of the power signal 141 of the AC source, and/or of the current drawn by the heating element 108. Still other examples of an operational state include an indication of a fault introduced during installation of an in-floor heating element. For instance, damage to a coil within the heating element 108 may be detected based on a resistance/voltage change measured by the power measurement circuitry 140 implementing the example line-fault test circuit 600 of FIG. 6. In response, the thermostat 304 may visualize an indication of the fault via the display 328, and/or emit an audible tone via speaker 134.

Also in the connected and powered state, the thermostat 304 can detect the presence of the adapter device 302, e.g., as opposed to other devices such as a thermostat base or backplane without the adapter device 302 coupled thereto, and in response to detecting the presence of the adapter device 302 visualize or otherwise enable one or more diagnostic and testing processes. The thermostat 304 may detect the presence of the adapter device 302 via, for instance, electrical communication with the adapter device 302 (e.g., a data bus) or simply through a configurable setting stored in the memory 132.

Continuing on, and in response to the thermostat 304 detecting the same is coupled to the adapter device 302, the thermostat 304 may then cause display 328 to show a user interface substantially similar to that of the user interface 138 shown in FIG. 1. Likewise, the mobile computing device 106 can receive a message/packet from the thermostat 104 via RF signal 125 that causes the mobile computing device 106 to visualize or otherwise enable access to the features shown via user interface 138.

A user/installer may then select one or more user interface elements of the user interface 138 to initiate a desired test mode. For example, test modes can comprise at least one of a voltage test to identify a voltage mismatch condition (also referred to herein as a voltage rating mismatch) between the power signal 141 of the AC power source and the heating element 108 and/or thermostat 104 based on a predetermined voltage rating for the heating element 108 stored in the memory 132, and/or an overcurrent test to energize the heating element 108 and detect if the same is drawing a current greater than a maximum predetermined current for the heating element 108 stored in the memory 132. The result(s) of the initiated tests may then be visualized via display 328 and/or the mobile computing device 106 as, for instance, a pass/fail indicator 142 (See FIG. 1). Alternatively, or in addition, the thermostat 304 sends the result(s) of the initiated tests to a remote computer server, e.g., via NIC 130, for technical support and quality control, as discussed above.

In view of the foregoing, the first switch 364-1 may therefore be momentarily actuated (e.g., by a finger of a user) to cause the power signal 141 to be supplied to the thermostat 304 to ensure that certain operations/modes, such as energizing the heating element 108, can be immediately disrupted/stopped to avoid damage to the heating element 108 and/or to minimize or otherwise reduce the chance of a potentially fatal electric shock. In one embodiment, the first switch 364-1 is configured to automatically cause the thermostat 304 to initiate one or more tests without necessarily requiring a user to initiate the tests via display 328 of the thermostat 304 or via the app of the mobile computing device 106.

Alternatively, or in addition, the first switch 364-1 is configured to cause maintained execution of one or more selected tests. For instance, the first switch 364-1 may be configured to mechanically toggle between two positions, e.g., an ON and an OFF position. However, it should be noted that the first switch 364-1 may be configured to support a range of actuation modes to allow for certain operations, e.g., such as energizing the heating element 108, to be momentary while others such as WiFi diagnostics to be maintained without a user supplying a force or otherwise maintaining contact with the first switch 364-1.

Power Measurement and Monitoring Circuitry

Figure 4A:
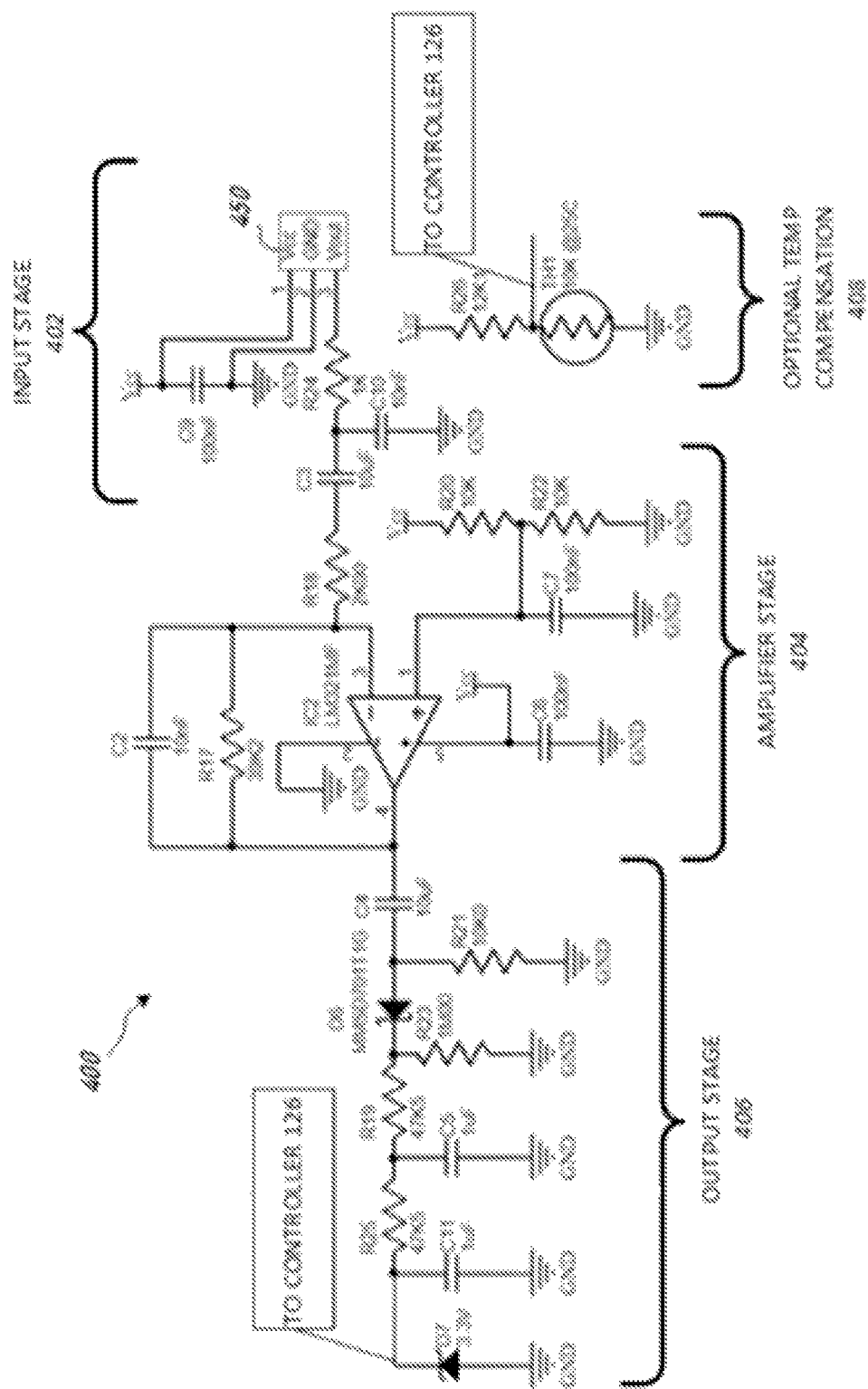
FIG. 4A shows an example ammeter circuit suitable for use in the example systems of FIGS. 1 and 2, in accordance with an embodiment of the present disclosure.

As discussed above, the system 100 can include power measurement and monitoring circuitry 140 implemented within the thermostat 104. FIG. 4A shows one example current measurement circuit (or ammeter circuit) 400 suitable for use in the power measurement and monitoring circuitry 140. The ammeter circuit 400 allows for a load drawn by a heating element, e.g., heating element 108, to be measured and output as a proportional electrical signal for diagnostic and/or historical power monitoring and tracking purposes.

The ammeter circuit 400 includes an input stage 402. The input stage 402 includes a terminal coupled to Vcc, e.g., coupled to a terminal of the second terminal block 114-2 providing conductor L1 or L2 (See FIG. 1). The input stage 402 further includes a sensor 450 implemented as a hall effect sensor to ensure electrical isolation between high and low-power sides. The input stage 402 then outputs, for instance, a low-voltage sinewave (e.g., 1V peak-to-peak) that proportionally represents an amount of current measured by the sensor 450. The low-voltage sinewave may also be referred to herein as a measured current waveform/signal.

The amplifier stage 404 includes an input coupled to the output of the input stage 402 to receive the measured current signal. The amplifier stage 404 includes an operational amplifier arrangement with a first input terminal electrically coupled to the input of the amplifier stage 404 to receive the measured current signal. The operational amplifier arrangement further includes a second input terminal coupled to a reference signal. The operational amplifier arrangement determines and amplifies a difference between the reference signal and the measured current signal. The amplifier stage includes a filter network comprising one or more filtering capacitors to, for instance, reject various unwanted high and/or low frequencies from the measured current signal. The operational amplifier arrangement then outputs a signal representing the determined differential.

The output stage 406 includes a first end electrically coupled to the output of the amplifier stage 404 to receive the signal representing the determined differential. The output stage 406 further includes a filter network comprising one or more filtering capacitors to for instance, reject various unwanted high and/or low frequencies from the signal representing the determined differential. The output stage 406 then outputs a signal representing a measured current drawn by the heating element 108. The controller 126 may then derive an electrical current value, e.g., in Amperes (A), based on the signal output stage 406 utilizing, for example, optional post-processing routine. However, the controller 126 may derive the measured current value through a relatively simple analog to digital conversion without necessarily modifying or otherwise performing post-processing on the signal from the output stage 406.

Note, the ammeter circuit 400 is preferably isolated from the primary voltage and current that is flowing through the heating element control circuit 112 to the heating element 108. To achieve isolation, the ammeter 400 can utilize a linear Hall Effect sensor that measures the magnetic field given off by the current that is flowing through the high voltage/high current trace/terminal to the heating element 108. However, other sensor types are also within the scope of this disclosure.

Continuing with FIG. 4A, the ammeter circuit 400 can include an optional temperature compensation stage 408 that electrically couples between output stage 406 and the controller 126. The optional temp compensation stage 408 can include a thermistor TH1 for temperature compensation purposes. Through experimentation and measurement, this disclosure has identified that the output stage 406 can output a signal to the controller 126 with variation tied to operating temperatures within, for instance, housing 101 (FIG. 1) or other associated enclosure.

Experiments were conducted with operating temperatures set at specific targets that included −35° C., 25° C. and 70° C. With −35° C. being selected as a target below UL requirements, and 70° C. being selected to represent high temperature environments. During the experiments, a heating element rated for 15 amperes was electrically coupled to an AC source and measured by the ammeter circuit 400 disposed within a housing and having an ambient temperature therein set to each of the aforementioned operating temperatures. Table 1 provided below summarizes the findings at each operating temperature target.

TABLE 1

| Current | Output at −35° C. | Output at 25° C. | Output at 70° C. |
| --- | --- | --- | --- |
| 0 A | 0.000 V | 0.000 V | 0.000 V |
| 1 A | 0.018 V | 0.095 V | 0.162 V |
| 3 A | 0.406 V | 0.539 V | 0.639 V |
| 5 A | 0.866 V | 1.034 V | 1.158 V |
| 8 A | 1.607 V | 1.808 V | 1.953 V |

As shown above, ambient operating temperature significantly varied the current measurement output by the ammeter circuit 400 across a range of loads introduced by the heating element. For instance, loads of 8A introduced a measurement variance of about 0.3V between operating temperatures of −35° C. and 70° C. Therefore, the optional temperature compensation stage 408 may be utilized to reduce temperature sensitivity and improve accuracy in a range of ambient operating temperatures.

Figure 4B:
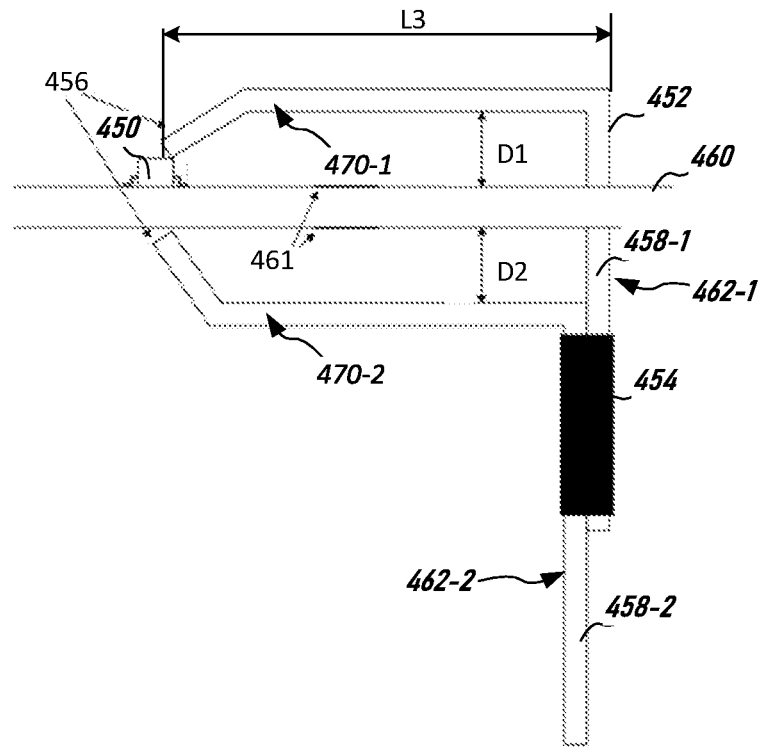
FIG. 4B shows an example flux concentrator suitable for use in the ammeter circuit of FIG. 4A, in accordance with an embodiment of the present disclosure.

The ammeter circuit 400 optionally implements a flux concentrator to increase measurement sensitivity and reduce noise. FIG. 4B shows an example flux concentrator 452 suitable for use in the ammeter circuit 400 of FIG. 4A. As shown, the flux concentrator 452 may comprise two substantially L-shaped pieces/sections (also referred to herein as concentrator members), namely first and second concentrator members 462-1, 462-2, respectively, that couple together physically and electrically at coupling section 454. The coupling section 454 can include, for instance, tape or other suitable approach to couple the concentrator members together.

Each of the first and second concentrator members 462-1, 462-2 include a stem, e.g., stems 458-1 and 458-2 respectively, and an arm that extends substantially transverse relative to the stem, e.g., at an angle of 80-100 degrees, and preferably an angle of 90 degrees. The stem and arm of each of the first and second concentrator members 462-1, 462-2, extend substantially parallel with each other, such as shown in FIG. 4B. The arm of each of the first and second concentrator members 462-1, 462-2 extends an overall length of L3 from an associated stem, with L3 measuring about 10-20 mm, and preferably 17 mm, for example.

Figure 4C:
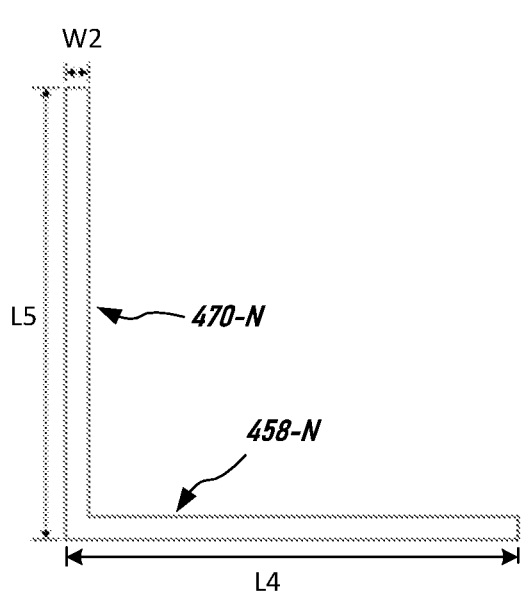
FIG. 4C shows a side view of a flux concentrator in accordance with an embodiment of the present disclosure.
Figure 4D:
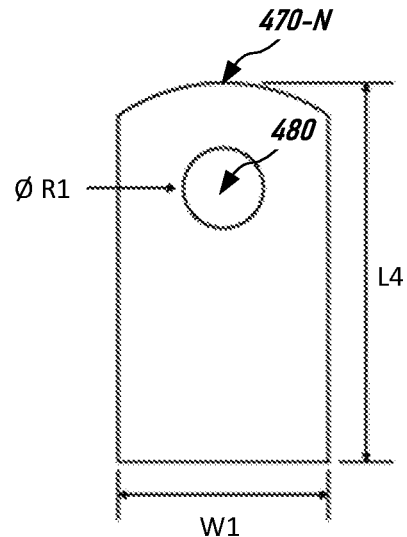
FIG. 4D shows a top view of a flux concentrator in accordance with an embodiment of the present disclosure.

As further shown more clearly in FIGS. 4C-4D, each concentrator member can include a stem 458-N having an overall length of L4, with L4 measuring 14-20 mm, and preferably 17 mm, although other lengths are within the scope of this disclosure. In addition, each arm 470-N can include an overall length of L5, with L5 measuring between 17-20 mm, for example. The overall width W1 of arm 470-N can measure 8-10 mm, for example. Each of the arm 470-N and stem 458-N can include an overall thickness W2 of between 0.5-1.5 mm, for example.

Returning to FIG. 4B, an end of each arm can include a bent/angled portion to extend into, or otherwise be in operable proximity of, flux sensing region 456. The flux sensing region 456 allows for magnetic flux to concentrate for detection purposes by sensor 450.

Each arm includes an offset distance of D1 relative to the mounting surfaces of a substrate 460 to minimize or otherwise reduce electrical interference. The substrate 460 comprises, for instance, a printed circuit board (PCB) or other suitable substrate for mounting of electrical components and traces. The offset distance D1 between the arms of the flux concentrator 452 and the substrate 460 measures 3 mm, for example, although other offset distances are within the scope of this disclosure. Accordingly, components such as copper traces 461 that are disposed on opposite mounting surfaces provided by the substrate 460 can be electrically isolated from the arms of the flux concentrator 452 based at least in part on the offset distance Dl.

As further shown in FIG. 4B, the stem 458-1 of the first concentrator member 462-1 extends at least partially through the substrate 460. This advantageously allows for each arm of the concentrator members to be disposed adjacent opposite sides of the substrate 460, and by extension, in a manner that provides the sensing region 456 with concentrated magnetic flux/energy. In addition, this allows for the flux concentrator 452 to securely couple to the substrate 460, e.g., based on a friction fit with the substrate 460 and/or via an adhesive such as epoxy.

The multi-member (or multi-piece) configuration of the flux concentrator 452 also allows for simplified manufacturing processes. For instance, the first and second concentrator members 462-1, 462-2 of the flux concentrator 452 may be installed in a multi-step process that includes, for instance, inserting the first concentrator member 462-1 through the substrate 460, and then subsequently coupling the second concentrator member 462-2 to the first concentrator member 462-1, e.g., via tape or other approach at coupling section 454. The through-hole/aperture (not shown) of the substrate 460 can include a profile that corresponds to the shape/profile of the flux concentrator 452, e.g., a substantially rectangular profile.

Thus, the aperture (not shown) of the substrate 460 provides a mechanical alignment member to ensure the stem and arm of the first concentrator member 462-1 is aligned and oriented with sensor 450 in a manner that disposes an arm of the same within operable proximity of the flux sensing region 456. In addition, the first concentrator member 462-1 coupled to the substrate 460 provides a second mechanical alignment member/feature for coupling of the second concentrator member 462-2. For instance, the multi-step process can then include coupling the second concentrator member 462-2 to the first concentrator member 462-1 in a stack/sandwich configuration that automatically aligns and orients the second concentrator 461-2 in a manner that disposes an associated arm in operable proximity with the flux sensing region 456, such as shown in FIG. 2.

Figure 4E:
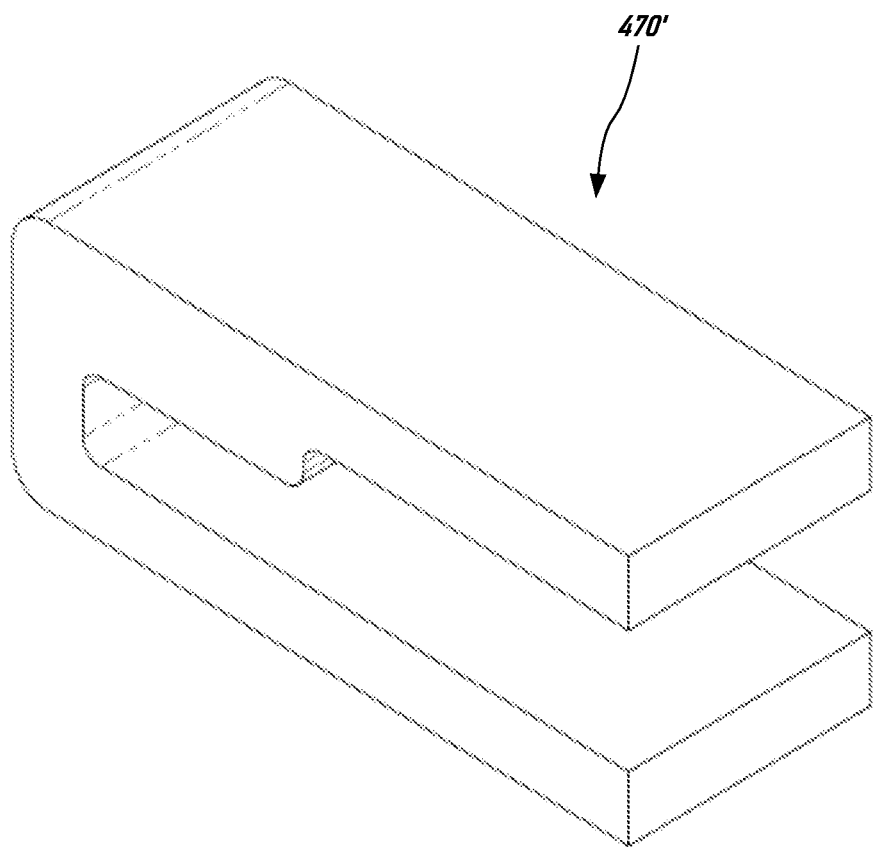
FIG. 4E shows another example flux concentrator suitable for use in the ammeter circuit of FIG. 4A, in accordance with an embodiment of the present disclosure.

FIG. 4E shows another example of a flux concentrator 470' suitable for use in the ammeter circuit 400 of FIG. 4A. As shown, the flux concentrator 470' can be formed from a single, monolithic piece of material. The flux concentrator 470' comprises electrical-insulating but magnetically-conductive material such as ferrite.

Figure 5:
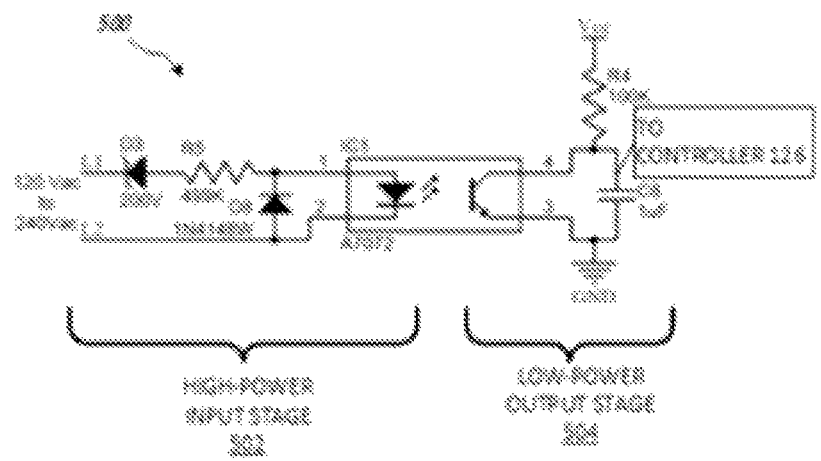
FIG. 5 shows an example voltage monitoring circuit suitable for use in the example systems of FIGS. 1 and 2, in accordance with an embodiment of the present disclosure.

FIG. 5 shows one example voltage measurement circuit (or voltage monitoring circuit) 500 suitable for use in the power measurement and monitoring circuitry 140. The voltage monitoring circuit 500 provides a relatively simple arrangement that detects if the heating element control circuit 112 is coupled to 120 Vac or 220/240 Vac, for example.

As shown, the voltage monitoring circuit 500 includes a high-power input stage 502 that includes terminals electrically coupled to conductors L1 and L2, e.g., via the second terminal block 114-2 (See FIG. 1). Conductors L1 and L2 are configured to communicate a signal having 120Vac or 220Vac, depending on a desired configuration. The high-power input stage 502 further includes an integrated circuit (IC) configured to electrically isolate the conductors L1 and L2 from a low-power output stage 504. As shown, the IC can be implemented as an optoisolator that provides a two-state, low-voltage output signal, e.g., 3.3-5V, inversely related to the voltage potential applied at the high-power input stage 502.

Thus, when the high-power stage is coupled to 120Vac the output of the IC and low-power output stage 504 is a solid high (also referred to herein as a first voltage level) with effectively zero ripple, e.g., 12Vdc or ~3.3Vdc. The output from the low-power output stage 504 then begins to drop when the input voltage reaches ~170 Vac. From 170 Vac and lower, the low-power output stage 504 outputs a signal that stabilizes at a low voltage (also referred to herein as a second voltage level) measuring between 0.5Vdc and 1Vdc, e.g., when AC power is measured at room temperature (e.g., about 60-70 degrees Celsius). Thus, the voltage monitoring circuit 500 allows for simple detection of 120Vac versus 220Vac (or 240Vac) through a course-grain comparison that allows for detecting the presence of a first predetermined voltage (e.g., 120 Vac) from a second predetermined voltage (e.g., 220/240Vac) based on the output signal providing a high and low value in the form of the above-mentioned first and second voltage levels.

The output signal of the low-power output stage 504 may therefore output between a high and low Vdc value to provide a logical HIGH and LOW value to the controller 126, respectively. Preferably, the low-power output stage 504 is configured to output a signal between 0.5Vdc and 3.3Vdc which allows for electrical interconnection with terminals of the controller 126 without the necessity of step-down/power conversion circuitry. However, other voltage values for the low-power output stage 504 are also within the scope of this disclosure such as 0Vdc to 12Vdc.

In an embodiment, temperature compensation may also be applied to the output signal of the low-power output stage 504. For example, as shown in Table 2, experimental results at various operating temperature set points demonstrates the temperature-dependence of the output signal from the low-power output stage 504.

TABLE 2

| Temperature (° C.) | Output starts to drop (Vac) | Output is a stable low (Vac) |
|---|---|---|
| −35 | 158 | 175 |
| 22 | 170 | 182 |
| 70 | 180 | 203 |

Figure 6:
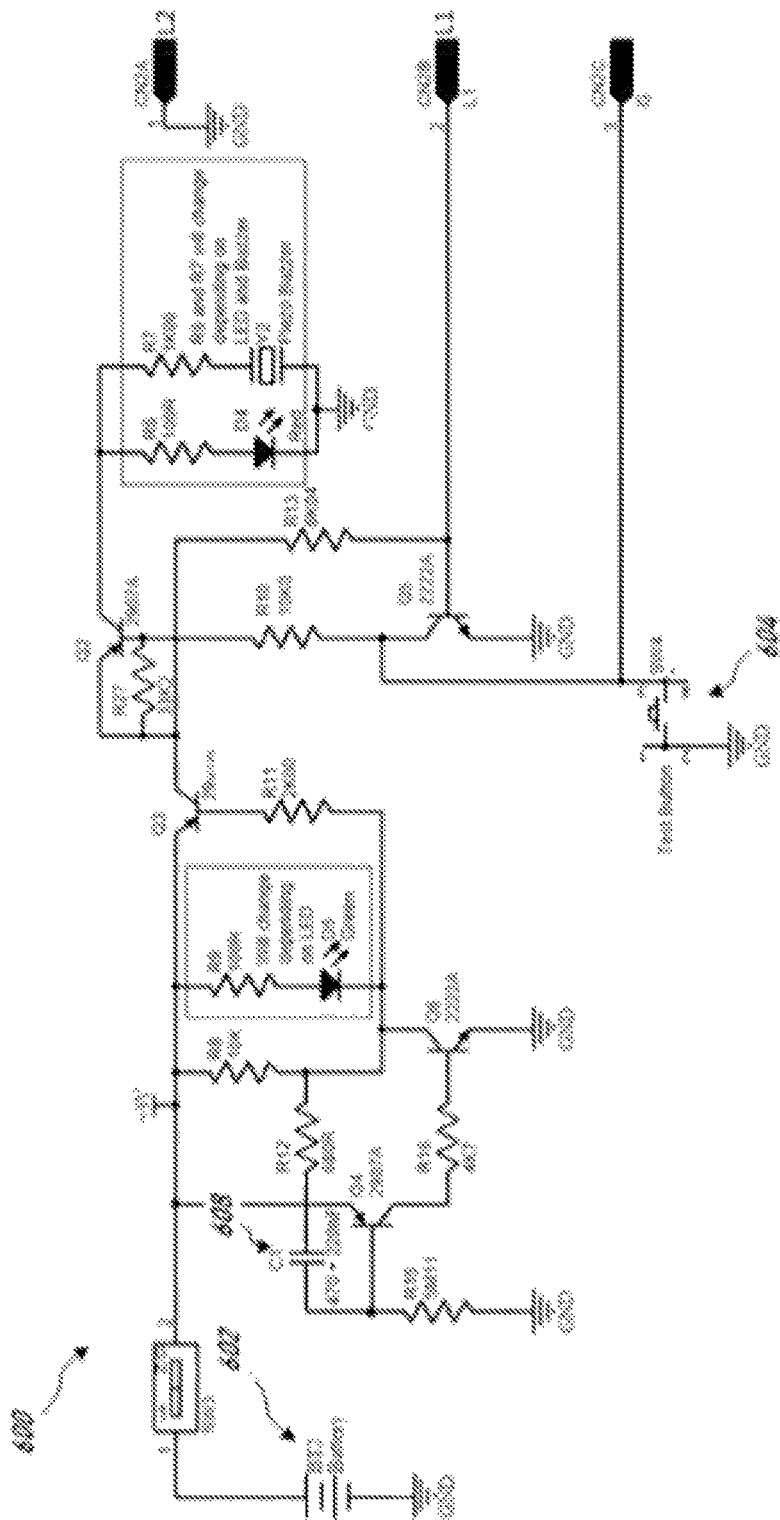
FIG. 6 shows an example low-power line-fault circuit suitable for use in the example systems of FIGS. 1 and 2, in accordance with an embodiment of the present disclosure.

FIG. 6 shows one example of a line-fault test circuit 600 suitable for use in the power measurement and monitoring circuitry 140. The line-fault test circuit 600 couples to terminals of the heating element 108, e.g., L1 and L2 via the second terminal block 114-2 (FIG. 1), and can detect a break along the heating element 108, e.g., due to damage during installation and/or mechanical defect in the heating element 108.

As shown, the line-fault test circuit 600 operates on a battery source 602, and preferably, a 3.3V coin cell battery. The line-fault test circuit 600 is configured to pulse at a predetermined interval, e.g., every 2-3 seconds, and supply a relatively low voltage signal (also referred to herein as a test voltage or test signal) to the heating element 108 via conductors L1 and L2, e.g., a 3.3 v signal or less. Each pulse lasts for a predetermined period of time, e.g., between 8-12 ms. The pulses may be achieved by capacitor 608 that operates as an oscillator.

In the event of a fault condition, e.g., a break within heating element 108, the line-fault test circuit 600 is configured to detect the same and cause an audible tone (e.g., via a piezo buffer and/or speaker 134 of FIG. 1) to be emitted. In addition, the line-fault test circuit 600 can drive one or more LEDS (e.g., D4) to visually indicate the present of the fault, e.g., through blinking or solid LED illumination. The line-fault test circuit 600 further includes test button 604 to simulate fault conditions and confirm proper operation of the line-fault test circuit 600.

Example Methodologies and Architecture

Note, the following momentary test process can be preceded by a registration sequence that allows a user/installer to register a thermostat, e.g., thermostat 104 (See FIG. 1), with a manufacturer via an "App" executed on the mobile computing device 106. For example, the mobile computing device 106 may utilize an integrated camera sensor to "scan"

a fiducial such as QR code disposed on the thermostat 104 and/or provided with the thermostat 104 via printed documentation. In response to detecting the fiducial, the mobile computing device 106 may utilize the same to determine an identifier (also referred to herein as a unique identifier) for the thermostat 104 and provide the same to a remote host, e.g., a computer server operated by the manufacturer accessible via the Internet. In addition, the app of the mobile computing device 106 may also be utilized by a user/installer to scan a fiducial (e.g., a QR code) of an in-floor heating element, for example, to determine electrical characteristics associated with the same. The electrical characteristics can comprise, for example, a voltage rating (e.g., 120Vac, or 220Vac) and maximum current rating.

The mobile computing device 106 may then store various settings and parameters in a database of the remote computer server (e.g., using the identifier) such as the voltage rating and/or maximum current rating for the heating element 108. Alternatively, or in addition, the various settings and parameters may also be stored in the memory 132 of the thermostat 104 using, for instance, messaging provided via RF signals 125, and/or through a user interface provided by the display 128.

Figure 7A:
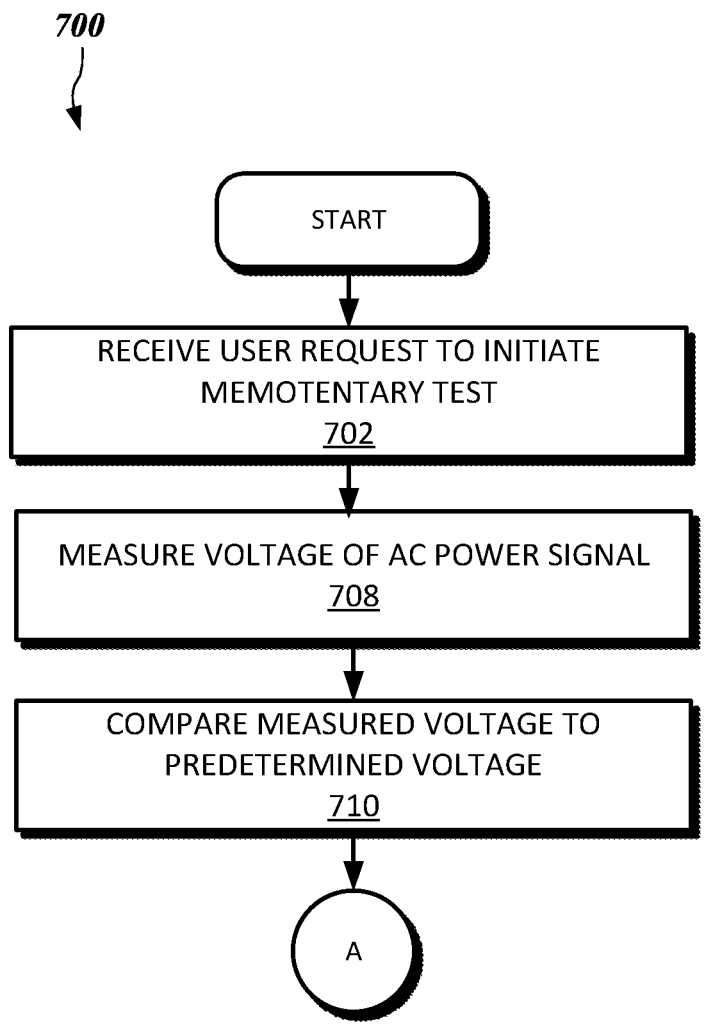
FIGS. 7A-7C collectively illustrate an example method of performing a momentary test using the example system of FIG. 1 or 2, in accordance with an embodiment of the present disclosure.
Figure 7B:
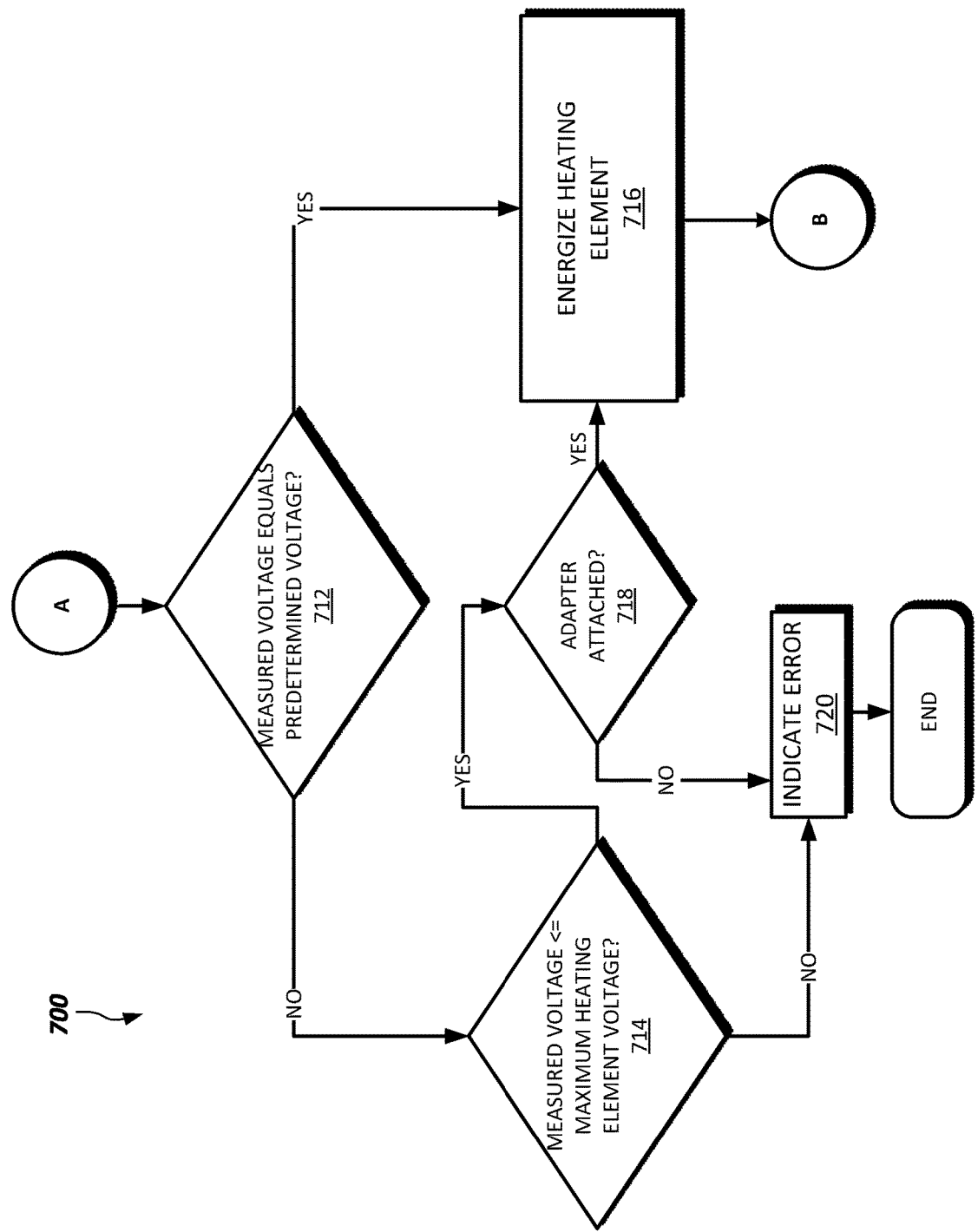
Figure 7C:
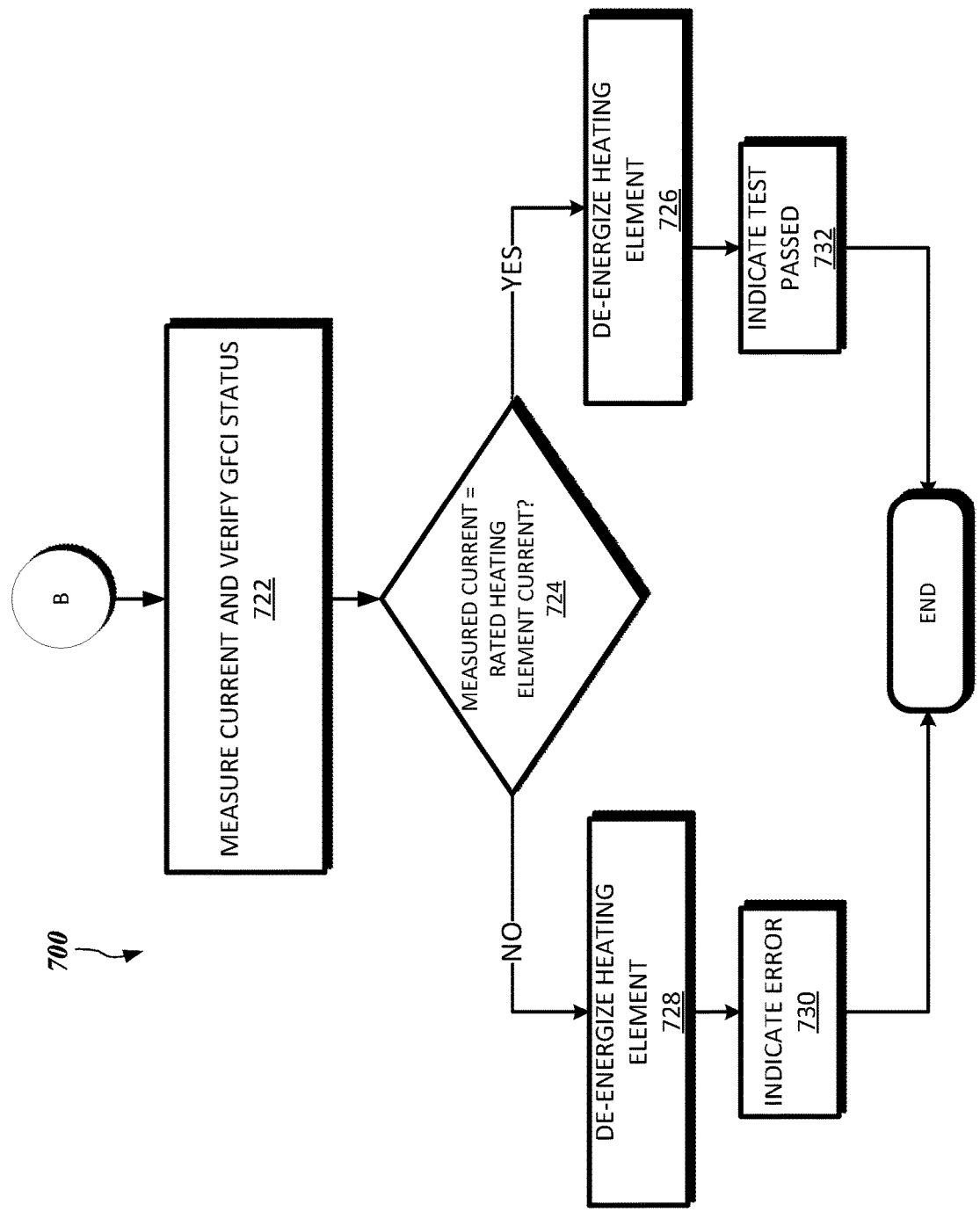

FIGS. 7A-7C collectively show a momentary test process 700 that exemplifies various aspects and features of the present disclosure. The momentary test process 700 can be performed by the controller 126 of the thermostat 104 (See FIG. 1), although this disclosure is not intended to be limited in this regard. For example, an "app" executed on a mobile computing device, e.g., such as mobile computing device 106, may be configured to perform various acts of the momentary test process 700 alone or in combination with controller 126.

The process 700 starts in act 702. In act 702, the controller 126 receives a user request to initiate a momentary test. The controller 126 receives the request via, for instance, a command received from the mobile computing device 106 by way of NIC 130 (See FIG. 1). Alternatively, the controller 126 receives the user request based on a user/installer supplying a force to actuate the first switch 164-1. Preferably, the controller 126 receives the user request based on actuation of both the first and second switches 164-1, 164-2.

Note, actuation of the first and/or second switches 164-1, 164-2 can cause the thermostat 104 to receive power (e.g., via an AC power source external to the thermostat 104) to energize components of the thermostat 104, e.g., the display 128, the controller 126, the NIC 130, the power measurement circuitry 140, without necessarily energizing the heating element 108. Accordingly, the controller 126 may also receive the user request to initiate the momentary test in act 702 after a user selects one or more menu/feature options via energized display 128, for example.

In act 708, the controller 126 measures the voltage of an AC power signal (e.g., power signal 141) using, for example, the voltage monitoring circuit 500 of FIG. 5. In act 710, the controller 126 compares the measured voltage to a predetermined voltage rating associated with the heating element 108. The controller 126 retrieves the predetermined voltage rating from, for example, the memory 132 or from another location such as a remote host/server that maintains the settings in a database that associates an identifier associated with the thermostat 104 with various settings and preferences, as discussed above.

In act 712, the controller 126 determines whether the measured voltage equals the predetermined voltage (e.g., is within an acceptable range defined by the predetermined voltage) retrieved in act 710. For example, the measured voltage may indicate a 220 Vac source and the predetermined voltage may be equal to 120Vac. If the measured voltage received in act 708 matches the predetermined voltage setting retrieved in act 710, the process continues to act 716. Otherwise, the process continues to act 714.

In act 714, the controller 126 determines if the measured voltage is less than or equal to a maximum heating element voltage for the heating element 108. A value/setting representing the maximum heating element voltage may be stored in the memory 132 of the thermostat 104, and/or in a remote computer server as discussed above. If the measured voltage is less than or equal to the maximum heating element voltage, the process 700 continues to act 718. Otherwise, the process 700 continues to act 720. In act 720, the controller 126 optionally indicates the error condition to the user via display 128 (FIG. 1), and/or via the user interface 138 of the mobile computing device 106. The process 700 then ends.

In act 718, the controller 126 determines if the thermostat 104 is attached/coupled to an adapter device, e.g., the adapter device 102 (See FIG. 1). Stated differently, in act 718, the controller 126 determines if the thermostat 104 is coupled to only a standard base/dock, e.g., thermostat base 103, or if the thermostat 104 is coupled to an adapter device consistent with the present disclosure. In an embodiment, the controller 126 determines whether the thermostat 104 is coupled to an adapter device based on a setting or other identified stored in the memory 132, for example. If the thermostat 104 is attached to an adapter device, the process 700 continues to act 716. Otherwise, the process continues to act 720 and the controller 126 optionally indicates the error condition to the user via display 128 (FIG. 1), and/or via the user interface 138 of the mobile computing device 106. The process 700 then ends.

In act 716, the controller 126 energizes the heating element 108 by providing a signal to the heating element control circuit 112. In response, the heating element control circuit 112 transitions the switch 118 to a closed state to electrically couple the heating element 108 with the power signal 141 of the AC power source, e.g., via conductors L1 and L2.

In act 722, the controller 126 measures current drawn via the heating element 108 using the ammeter circuit 400 of FIG. 4A, for example. Also in act 722, the controller 126 optionally determines whether the OIC 121 (See FIG. 1) is in an overcurrent fault state or a normal state. If the OIC 121 is in an overcurrent fault state, the controller 126 optionally indicates the error condition to the user via display 128 (FIG. 1), and/or via the user interface 138 of the mobile computing device 106, and the process 700 then end. Otherwise, the process 700 continues to act 724.

In act 724, the controller 126 determines whether the current measured in act 722 is approximately equal to the rated heating element current (also referred to herein as a predefined current). A value/setting representing the rated heating element current may be stored in the memory 132 of the thermostat. Otherwise, the process 700 continues to act 728.

In act 728, the controller 126 de-energizes the heating element 108 by, for example, providing a signal (or a lack thereof) to the heating element control circuit 112 to cause the same to switchably decouple the heating element 108 from the power signal 141 of the AC power source. This can include the heating element control circuit 112 providing a signal to switch 118, with the signal causing the switch 118 to transition to an open state to cause the heating element 108 to electrically decouple from the power signal 141 of the AC power source. The process 700 then continues to act 730 and the controller 126 optionally indicates the error condition to the user via display 128 (FIG. 1), and/or via the user interface 138 of the mobile computing device 106. The process 700 then ends.

In act 726, the controller 126 de-energizes the heating element 108 as discussed above in act 728. In act 732, the controller 126 indicates the momentary test was successful to the user via display 128 (FIG. 1), and/or via the user interface 138 of the mobile computing device 106. The process 700 then ends.

In accordance with an aspect, the present disclosure may feature an adapter device to removably couple to a thermostat and provide temporary electrical interconnection between the thermostat, an in-floor heating element, and an AC power source during installation and testing of the in-floor heating element. The adapter device may include a housing, a heating element interconnect disposed on the housing to electrically couple to an in-floor heating element, an alternating current (AC) power source interconnect coupled to the housing to electrically couple with an AC power source to receive a power signal, a thermostat mounting region defined by the housing to removably couple to the thermostat, and a first switch coupled to the housing. The thermostat mounting region may include at least one electrical interconnect to electrically couple to the thermostat. The first switch may have a closed state to electrically couple the received power signal to the thermostat and/or the in-floor heating element, and an open state to electrically decouple the received power signal from the thermostat and/or the in-floor heating element. The first switch may be configured to receive a user-supplied force, and in response to receiving the user-supplied force, transition to the closed state to cause the in-floor heating element to energize via the received power signal.

The first switch may be configured to mechanically interrupt electrical communication between at least the in-floor heating element and the AC power source in response to being transitioned to the open state. For example, the first switch may be configured to mechanically interrupt electrical communication between the in-floor heating element and the AC power source, and the thermostat and the AC power source, in response to being transitioned to the open state. The first switch may include a button configured to be displaced by the user-supplied force to transition the first switch to a closed state. The button of the first switch may include a spring member to cause the first switch to transition from the closed state to the open state in response to an absence of the user-supplied force. The first switch may be coupled to a first sidewall of the housing. The thermostat mounting region may be defined by at least a second sidewall of the housing. The first sidewall may extend substantially transverse relative to the second sidewall of the housing.

The first switch may be configured to electrically couple the received power signal to the thermostat in response to the first switch transitioning from the open state to the closed state. The first switch may be configured to electrically couple the received power signal to the thermostat and the in-floor heating element in response to the first switch transitioning from the open state to the closed state. The first switch may be provided by the at least one electrical interconnect of the thermostat mounting region. The first switch may be configured to receive the user-supplied force to transition to the closed state based on a user coupling the thermostat to the thermostat mounting region and displacing the first switch with a portion of the thermostat and/or a portion of a thermostat base of the thermostat. The first switch may be configured automatically transition to the open state in response to the thermostat being decoupled from the thermostat mounting region.

The adapter device may further include a second switch coupled to the housing. The second switch may be configured to transition between a closed state and an open state, the closed state to electrically couple the received power signal to the thermostat and/or the in-floor heating element, and an open state to electrically decouple the received power signal from the thermostat and/or the in-floor heating element. The second switch may include a momentary switch. The second switch may include a pogo pin. The second switch may be disposed at a center of the thermostat mounting region. The second switch may be provided at least in part by the at least one electrical interconnect of the thermostat mounting region.

The first and second switches may collectively provide a safety interlock. The safety interlock may be configured to prevent electrical coupling between the received power signal and the thermostat based at least in part on the first and/or second switch.

The first and second switches may collectively provide a safety interlock, the safety interlock to prevent electrical coupling between the power signal and the thermostat and/or between the power signal and the in-floor heating element based at least in part on the first and/or second switch.

The thermostat mounting region may define a cavity. The cavity of the thermostat mounting region may be configured to receive at least a portion of the thermostat and/or a thermostat base of the thermostat. At least one electrical interconnect may be disposed in the cavity of the thermostat mounting region. A portion of the at least one electrical interconnect may extend into the cavity. At least one electrical interconnect may be configured to electrically couple to the thermostat in response to the thermostat and/or a thermostat base of the thermostat being at least partially received within the cavity. The at least one electrical interconnect may be a pin that extends substantially transverse from the housing. The at least one interconnect may be a pogo pin.

The AC power source interconnect may be configured with a socket to couple to a male or female plug. The socket may be configured to couple to an IEC-320-C13 or IEC-320-C14 plug.

The heating element interconnect may include a plurality of terminals for electrically coupling to the in-floor heating element via a plurality of conductor wires. The heating element interconnect may include a door coupled to the housing. The door may at least partially cover the plurality of terminals. The door may define a plurality of apertures, each aperture of the plurality of apertures configured to allow at least one conductor wire of the plurality of conductor wires to extend therethrough and couple to an associated terminal of the plurality of terminals. The door may define a plurality of apertures, each aperture of the plurality of apertures configured to allow at least one conductor wire of the plurality of conductor wires and an associated sheath to extend therethrough. The door may include a tensioning member to adjustably set an amount of bias force supplied against the door and towards the housing. The tensioning member may include a screw. The door may be configured to provide strain relief for the plurality of conductor wires.

The adapter device may further include a relay. The relay may be configured to electrically couple the in-floor heating element to the power signal based at least in part on the first switch being in the closed state. The relay may be disposed in the housing.

The adapter device may further include a temporary mounting member coupled to the housing. The temporary mounting member may be configured to allow the housing to removably couple to a wall or other vertical surface. The temporary mounting member may include a through hole for temporarily coupling the housing to the wall or surface via a temporary attachment device. The temporary attachment device may include a nail, screw, or peg.

In accordance with another aspect, the present disclosure may feature a thermostat for use with at least one in-floor heating element. The thermostat may include a housing, a heating element control circuit coupled to the housing, a first power measurement circuit coupled to the housing, and a controller. The heating element control circuit may be configured to cause an in-floor heating element to electrically couple to an AC power source. The first power measurement circuit may be configured to measure a first electrical characteristic of the in-floor heating element and/or the AC power source. The controller may be configured to receive the first electrical characteristic and detect a fault based on comparing the first measured electrical characteristic to a predefined electrical value.

The controller may be configured to cause the heating element control circuit to switchably decouple the in-floor heating element from the AC power source in response to the detected fault. The controller may be configured to prevent the heating element control circuit from electrically coupling the in-floor heating element to the AC power source in response to the detected fault.

The heating element control circuit may include a relay to switchably electrically couple the in-floor heating element to the AC power source.

The first electrical characteristic measured by the first power measurement circuit may include a voltage of the AC power source or a current drawn by the in-floor heating element.

The first power measurement circuit may be a voltage monitoring circuit. The first measured electrical characteristic may represent a measured voltage of the AC power source. The first power measurement circuit may be configured to output a first voltage signal representing a measured voltage of the AC power source. The first voltage signal may include at least a first voltage level to indicate presence of a first predetermined voltage provided by the AC power source and a second voltage level to indicate a presence of a second predetermined voltage provided by the AC power source. The first predetermined voltage may be 120 Volts of alternating current (Vac). The second predetermined voltage may be 220Vac or 240Vac. The first voltage level may be greater than the second voltage level, the first and second voltage levels providing a logical high or low, respectively, for input to the controller.

The thermostat may further include memory to store at least one predefined voltage rating representing a maximum voltage rating for the in-floor heating element. The fault may indicate a voltage rating mismatch between the in-floor heating element and the AC power source. The controller may be configured to detect the voltage rating mismatch based on the measured voltage of the AC power source being different than the predefined voltage rating. The controller may be configured to prevent the heating element control circuit from electrically coupling the in-floor heating element to the AC power source in response to the detected voltage rating mismatch. The thermostat may further include a speaker, and the controller may be configured to cause the speaker to emit an audible tone in response to the detected voltage rating mismatch. The thermostat may further include a network interface circuit (NIC), and the controller may be configured to send a message to a remote computing device via the NIC based on the detected voltage rating mismatch. The thermostat may further include a display, and the controller is configured to cause the display to visualize an indicator based on the detected voltage mismatch.

The first power measurement circuit may be an ammeter circuit, and the first measured characteristic may represent a measured current drawn by the in-floor heating element from the AC power source. The thermostat may further include memory to store at least one predefined current rating that represents a maximum current for the in-floor heating element. The fault may indicate an overcurrent condition of the in-floor heating element, and the controller may be configured to detect the overcurrent condition based on the first measured electrical characteristic indicating the measured current drawn by the in-floor heating element from the AC power source is greater than the predefined current rating. The controller may be configured to electrically decouple the in-floor heating element from the AC power source in response to the detected overcurrent condition. The thermostat may further include a speaker, and the controller may be configured to cause the speaker to emit an audible tone in response to the detected overcurrent condition. The thermostat may further include a network interface circuit (NIC), and the controller may be configured to send a message to a remote computing device via the NIC based on the detected overcurrent condition. The thermostat may further include a display, and the controller may be configured to cause the display to visualize an indicator based on the detected overcurrent condition.

The first power measurement circuit may be a line-fault test circuit configured to electrically couple to first and second terminals of the in-floor heating element and supply a test voltage to the in-floor heating element. The first measured electrical characteristic may be a voltage potential measured between the first and second terminals of the in-floor heating element. The controller may be configured to detect the fault based on the voltage potential, the detected fault indicating an open circuit condition of the in-floor heating element. The thermostat may further include a speaker, and the controller may be configured to cause the speaker to emit an audible tone in response to the detected open circuit condition. The thermostat may further include a network interface circuit (NIC), and the controller may be configured to send a message to a remote computing device via the NIC in response to the detected open circuit condition. The thermostat may further include a display, and the controller may be configured to cause the display to visualize an indicator based on the detected open circuit condition.

The thermostat may further include a second power measurement circuit. The first and second power measurement circuit may be configured to measure different electrical characteristics of the AC power source and/or in-floor heating element. The first power measurement circuit may be disposed in the housing of the thermostat. The thermostat may further include a network interface circuit (NIC), and the controller may be configured to send a message to a remote computing device via the NIC in response to the detected fault. The thermostat may further include a display, and the controller may be configured to cause the display to visualize a user interface, the user interface displaying at least one operational status of the thermostat based on the first measured electrical characteristic. The thermostat may further include a display, and the controller may be configured to cause the display to visualize a user interface. The user interface may be configured to receive user input and initiate a test mode based at least in part on the first power measurement circuit. The test mode may be configured to detect a voltage mismatch between the in-floor heating element and the AC power source and/or an overcurrent condition based on the in-floor heating element drawing a current from the AC power source greater than a predefined maximum current rating. The display may be configured as a touch-sensitive display.

The thermostat may further include a network interface circuit (NIC). The controller may be configured to receive data from a remote sensor via the NIC. The remote sensor may be a remote temperature sensor disposed adjacent the in-floor heating element. The controller may be configured to initiate a test mode based at least in part on the first power measurement circuit in response to receiving a request from a remote computing device via the NIC. The test mode may be configured to detect a voltage mismatch between the in-floor heating element and the AC power source and/or an overcurrent condition based on the in-floor heating element drawing a current from the AC power source greater than a predefined maximum current rating.

In accordance with another aspect, the present disclosure may feature the combination of an adapter device and a thermostat for use with at least one in-floor heating element. The adaptor device may be configured to removably couple to the thermostat and provide temporary electrical interconnection between the thermostat, the in-floor heating element, and an AC power source during installation and testing of the in-floor heating element. The adaptor and the thermostat may include any adaptor and/or thermostat described herein.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that any adaptor and/or thermostat described herein may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A thermostat for use with at least one in-floor heating element, the thermostat comprising:
   a housing;
   a heating element control circuit disposed within the housing, the heating element control circuit to cause an in-floor heating element to electrically couple to an alternating current power source;
   memory disposed within the housing, the memory configured to store at least one predefined AC voltage rating representing an AC voltage rating for the in-floor heating element;
   a first power measurement circuit disposed within the housing, the first power measurement circuit configured to detect a voltage of the alternating current power source; and
   a controller disposed within the housing, the controller comprising a voltage monitoring circuit configured to detect an AC voltage rating mismatch based on a comparison of the detected voltage of the alternating current power source with the predefined AC voltage rating prior to energizing the in-floor heating element.

2. The thermostat of claim 1, wherein the controller is configured to prevent the heating element control circuit from electrically coupling the in-floor heating element to the alternating current power source in response to the detected voltage rating mismatch.

3. The thermostat of claim 1, wherein the first power measurement circuit further includes an ammeter circuit configured to detect current drawn by the in-floor heating element from the alternating current power source.

4. The thermostat of claim 3, wherein the memory is configured to store at least one predefined current rating that represents a maximum current for the in-floor heating element, wherein the controller is further configured to detect an overcurrent condition based on the detected current drawn by the in-floor heating element from the alternating current power source being greater than the predefined current rating.

5. The thermostat of claim 4, wherein the controller is configured to electrically decouple the in-floor heating element from the alternating current power source in response to the overcurrent condition.

6. The thermostat of claim 1, further comprising a second power measurement circuit, the first and second power measurement circuit being configured to detect different electrical characteristics of at least one of the alternating current power source or in-floor heating element.

7. The thermostat of claim 1, further comprising a network interface circuit, and wherein the controller is configured to send a message to a remote computing device via the network interface circuit in response to the voltage rating mismatch.

8. The thermostat of claim 1, further comprising a display mounted to the housing, wherein the controller is configured to cause the display to visualize a user interface, the user interface displaying at least one operational status of the thermostat based, at least in part, on the first measured electrical characteristic.

9. The thermostat of claim 1, further comprising a display, and wherein the controller is configured to cause an error message to be indicated by the display, the error message indicative of the voltage rating mismatch.

10. The thermostat of claim 1, wherein the controller is configured to receive data from a remote sensor.

11. The thermostat of claim 10, wherein the remote sensor is a remote temperature sensor disposed adjacent the in-floor heating element.

12. The thermostat of claim 3, further comprising a network interface circuit, wherein the controller is configured to initiate a test mode based, at least in part, in response to receiving a request from a remote computing device via the network interface circuit.

13. The thermostat of claim 12, wherein the test mode is configured to detect at least one of the voltage mismatch or the overcurrent condition.

14. A thermostat for use with at least one in-floor heating element, the thermostat comprising:
   a housing;
   a heating element control circuit disposed within the housing, the heating element control circuit to cause an in-floor heating element to electrically couple to an alternating current power source;
   a first power measurement circuit disposed within the housing, the first power measurement circuit configured determine if a voltage of the alternating current power source is a first predetermined voltage or a second predetermined voltage and generate an output signal representative of the determined voltage of the alternating current power source; and a controller disposed within the housing, the controller configured to:

receive the output signal; and prior to energizing the in-floor heating element, compare the output signal to a predefined AC voltage rating associated with the in-floor heating element, the predefined AC voltage rating associated with the in-floor heating element being representative of an operating voltage of the in-floor heating element;

wherein the controller is further configured to prevent energizing the in-floor heating element if the comparison results in a mismatch between the output signal and the predefined AC voltage rating associated with the in-floor heating element.

15. The thermostat of claim 14, wherein the first power measurement circuit further includes an ammeter circuit configured to detect current drawn by the in-floor heating element from the alternating current power source.

16. The thermostat of claim 15, the controller is further configured to detect an overcurrent condition based on the detected current drawn by the in-floor heating element from the alternating current power source being greater than a predefined current rating that represents a maximum current for the in-floor heating element.

17. The thermostat of claim 16, wherein the controller is configured to electrically decouple the in-floor heating element from the alternating current power source in response to the overcurrent condition.

18. The thermostat of claim 14, further comprising a second power measurement circuit, the first and second power measurement circuit being configured to detect different electrical characteristics of at least one of the alternating current power source or in-floor heating element.

19. The thermostat of claim 14, further comprising a network interface circuit, and wherein the controller is configured to send a message to a remote computing device via the network interface circuit in response to the voltage rating mismatch.

20. The thermostat of claim 14, further comprising a display mounted to the housing, wherein the controller is configured to cause the display to visualize a user interface, the user interface displaying at least one operational status of the thermostat based, at least in part, on the first measured electrical characteristic.

21. The thermostat of claim 14, further comprising a display, and wherein the controller is configured to cause an error message to be indicated by the display, the error message indicative of the voltage rating mismatch.

22. The thermostat of claim 14, wherein the controller is configured to receive data from a remote sensor.

23. The thermostat of claim 22, wherein the remote sensor is a remote temperature sensor disposed adjacent the in-floor heating element.

24. The thermostat of claim 15, further comprising a network interface circuit, wherein the controller is configured to initiate a test mode based, at least in part, in response to receiving a request from a remote computing device via the network interface circuit.

25. The thermostat of claim 24, wherein the test mode is configured to detect at least one of the voltage mismatch or the overcurrent condition.

* * * * *